United States Patent
Watanabe

(10) Patent No.: US 8,811,681 B2
(45) Date of Patent: Aug. 19, 2014

(54) BIOMETRIC AUTHENTICATION APPARATUS AND BIOMETRIC AUTHENTICATION METHOD

(75) Inventor: Masaki Watanabe, Osaka (JP)

(73) Assignee: Fujitsu Limited, Kawasaki (JP)

( * ) Notice: Subject to any disclaimer, the term of this patent is extended or adjusted under 35 U.S.C. 154(b) by 52 days.

(21) Appl. No.: 13/602,910

(22) Filed: Sep. 4, 2012

(65) Prior Publication Data
US 2012/0328165 A1 Dec. 27, 2012

Related U.S. Application Data

(63) Continuation of application No. PCT/JP2010/001717, filed on Mar. 10, 2010.

(51) Int. Cl.
*G06K 9/00* (2006.01)

(52) U.S. Cl.
USPC ........... 382/115; 382/116; 382/117; 382/123; 382/124; 382/289; 382/294; 382/296; 382/298

(58) Field of Classification Search
USPC .......................................................... 382/115
See application file for complete search history.

(56) References Cited

U.S. PATENT DOCUMENTS

| | | | | |
|---|---|---|---|---|
| 7,327,861 B2* | 2/2008 | Choshi et al. | ................. | 382/124 |
| 7,359,531 B2* | 4/2008 | Endoh et al. | ................. | 382/115 |
| 7,362,888 B2* | 4/2008 | Abiko | ........................... | 382/124 |
| 7,519,198 B2* | 4/2009 | Endoh et al. | ................. | 382/115 |
| 7,660,446 B2* | 2/2010 | Abe | .............................. | 382/124 |
| 7,725,733 B2* | 5/2010 | Higashiura et al. | ........... | 713/186 |
| 7,747,043 B2* | 6/2010 | Kamata et al. | ................. | 382/115 |
| 8,000,503 B2* | 8/2011 | Kamata et al. | ................. | 382/115 |
| 8,190,239 B2* | 5/2012 | Endoh et al. | .................. | 600/473 |
| 8,310,358 B2* | 11/2012 | Watanabe et al. | ............. | 340/500 |
| 8,411,925 B2* | 4/2013 | Fuchigami et al. | ........... | 382/131 |
| 2002/0058874 A1* | 5/2002 | Ono et al. | ..................... | 600/476 |
| 2003/0123711 A1* | 7/2003 | Kim et al. | ..................... | 382/117 |
| 2004/0004766 A1* | 1/2004 | Dowski, Jr. | ..................... | 359/558 |
| 2005/0047632 A1* | 3/2005 | Miura et al. | .................. | 382/124 |
| 2005/0286745 A1* | 12/2005 | Kamata et al. | ................ | 382/115 |

(Continued)

FOREIGN PATENT DOCUMENTS

| | | |
|---|---|---|
| EP | 1 739 592 | 1/2007 |
| EP | 2 009 596 | 12/2008 |

(Continued)

OTHER PUBLICATIONS

Toshiyuki Ozawa, et al., "Noninvasive Measurement of Hemoglobin Concentration Using the Near-Infrared Spectroscopic Imaging Method," JSMBE, 2005, pp. 93-102.

(Continued)

*Primary Examiner* — Jayesh A Patel
*Assistant Examiner* — Iman K Kholdebarin
(74) *Attorney, Agent, or Firm* — Staas & Halsey LLP

(57) ABSTRACT

A biometric authentication apparatus includes an image shooting unit to capture a vessel image of a person to be authenticated and an authentication unit to verify verification vessel position information of the captured vessel image of the person to be authenticated against registered vessel position information of a registered vessel image registered in advance. When the verification vessel position information is not identical with the registered vessel position information, the authentication unit performs authentication using vessel size information of the registered vessel image registered in advance.

12 Claims, 22 Drawing Sheets

(56) References Cited

U.S. PATENT DOCUMENTS

| | | | |
|---|---|---|---|
| 2006/0095491 A1* | 5/2006 | Abe | 708/400 |
| 2007/0003112 A1 | 1/2007 | Awatsu et al. | |
| 2007/0217660 A1* | 9/2007 | Komura et al. | 382/115 |
| 2008/0137920 A1 | 6/2008 | Miura et al. | |
| 2008/0188750 A1* | 8/2008 | Randall et al. | 600/454 |
| 2008/0273762 A1* | 11/2008 | Kato | 382/115 |
| 2009/0005693 A1* | 1/2009 | Brauner et al. | 600/481 |
| 2009/0083850 A1* | 3/2009 | Fadell et al. | 726/19 |
| 2009/0304237 A1* | 12/2009 | Yoshikawa et al. | 382/116 |
| 2009/0328239 A1* | 12/2009 | Brauner et al. | 800/3 |
| 2010/0045432 A1* | 2/2010 | Abe | 340/5.83 |
| 2010/0098299 A1* | 4/2010 | Muquit et al. | 382/115 |
| 2010/0142771 A1 | 6/2010 | Miura et al. | |
| 2010/0195893 A1* | 8/2010 | Fuchigami et al. | 382/132 |
| 2010/0239128 A1* | 9/2010 | Mohammad et al. | 382/115 |
| 2011/0243396 A1* | 10/2011 | Hama et al. | 382/115 |
| 2012/0114195 A1* | 5/2012 | Matsuda et al. | 382/115 |
| 2012/0300988 A1* | 11/2012 | Ivanov et al. | 382/115 |
| 2012/0328165 A1* | 12/2012 | Watanabe | 382/115 |
| 2013/0162947 A1* | 6/2013 | Spasovski | 351/206 |
| 2013/0294658 A1* | 11/2013 | Kamata et al. | 382/115 |
| 2014/0018645 A1* | 1/2014 | Wada et al. | 600/316 |

FOREIGN PATENT DOCUMENTS

| | | |
|---|---|---|
| JP | 07-213511 | 8/1995 |
| JP | 2003-123059 | 4/2003 |
| JP | 2004-054698 | 2/2004 |
| JP | 2005-71118 | 3/2005 |
| JP | 2006-031103 | 2/2006 |
| JP | 2007-11769 | 1/2007 |
| JP | 2007-207150 | 8/2007 |
| JP | 2008-077269 | 4/2008 |
| JP | 2009-9434 | 1/2009 |

OTHER PUBLICATIONS

International Search Report mailed Apr. 6, 2010 in corresponding International Application No. PCT/JP2010/001717.

International Preliminary Report on Patentability issued Sep. 27, 2012 (English Translation mailed Oct. 11, 2012) in corresponding International Patent Application No. PCT/JP2010/001804.

Japanese Office Action mailed Jun. 11, 2013 in corresponding Japanese Application No. 2012-504146.

* cited by examiner

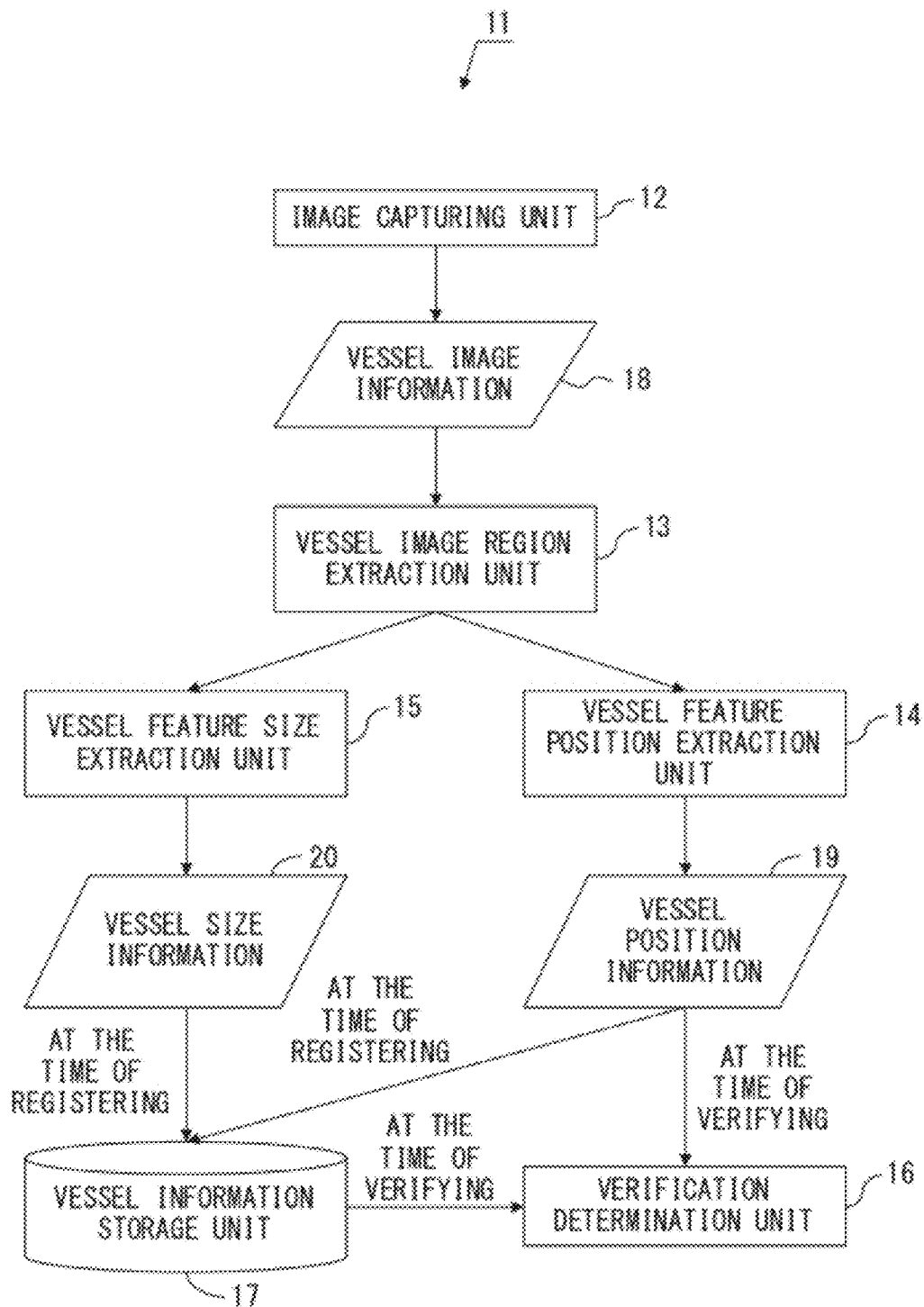
F I G. 1

VESSEL IMAGE AT THE
TIME OF REGISTERING

VESSEL IMAGE AT THE TIME
OF VERIFYING (COLD
TEMPERATURE)

FEATURE EXTRACTION FROM
VESSEL IMAGE AT THE
TIME OF REGISTERING

FEATURE EXTRACTION AT THE
TIME OF VERIFYING (COLD
TEMPERATURE)

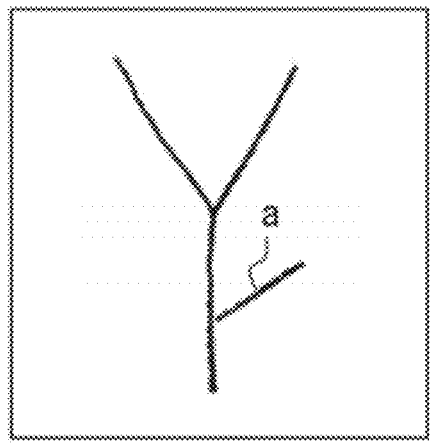 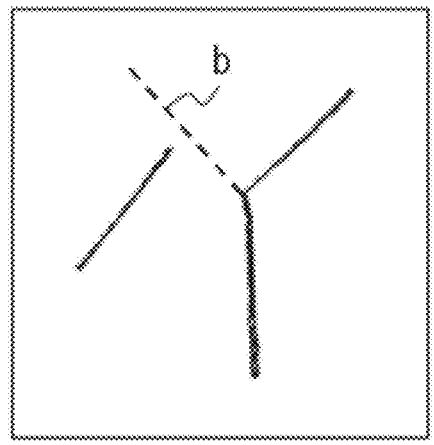
ANOTHER PERSON'S CASE I
(INCLUSION RELATIONSHIP
IS NOT ACHIEVED)
ANOTHER PERSON'S CASE II
(SIZE OF NOT-CONFORMING
FEATURE IS GREATER THAN
SIZE OF CONFORMING
FEATURE)
FIG. 6A
FIG. 6B

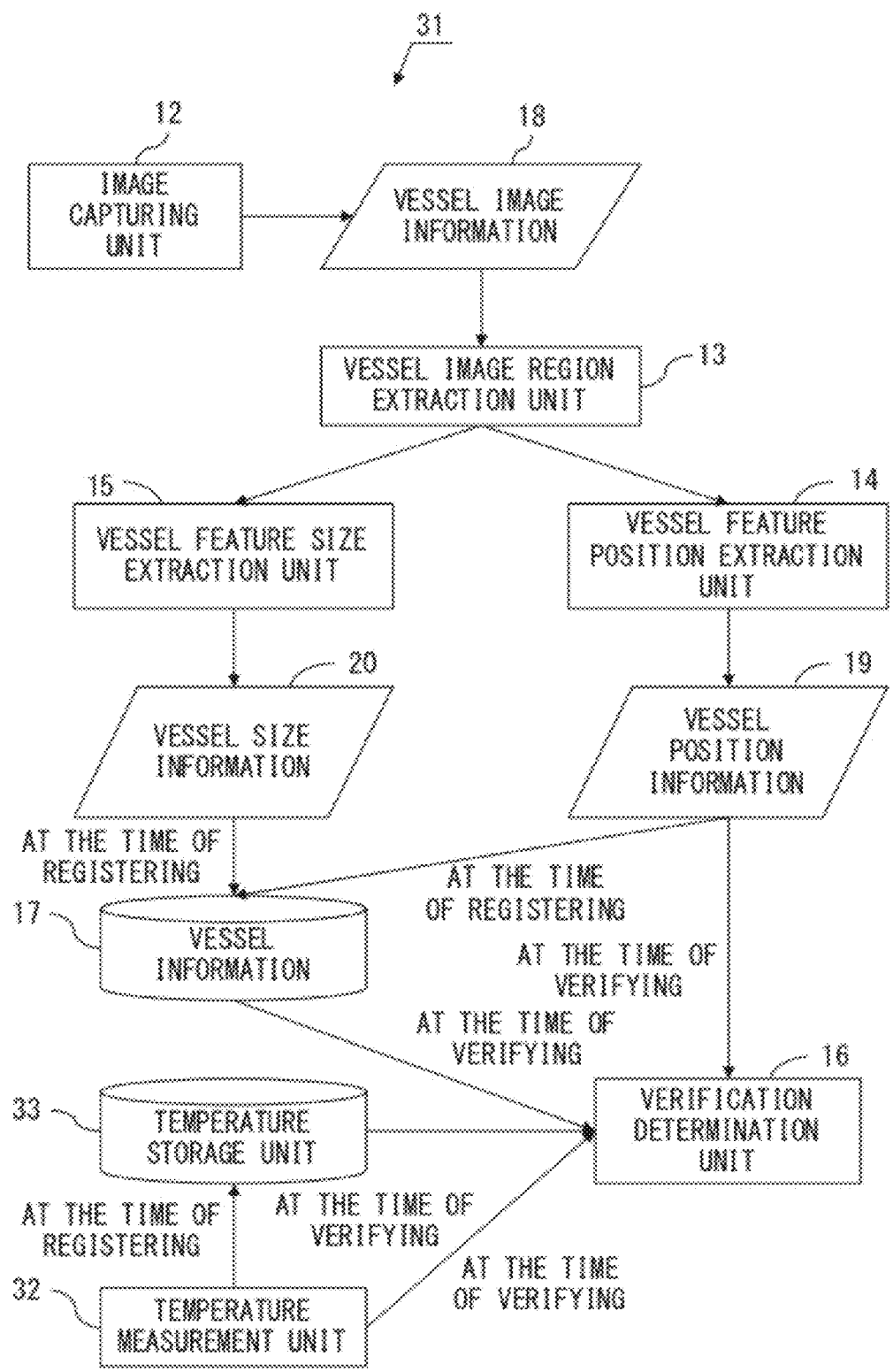
F I G. 7

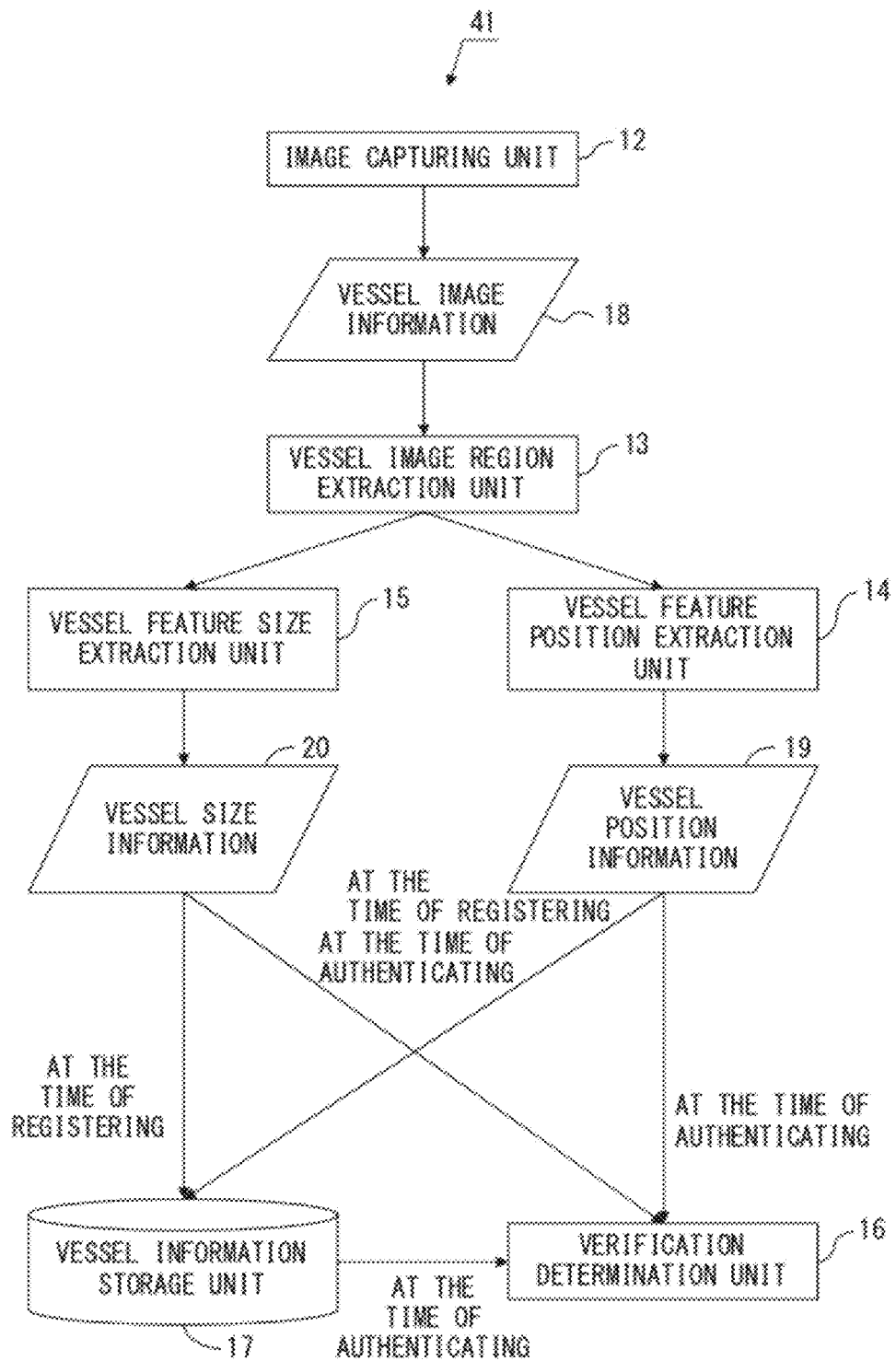
F I G. 10

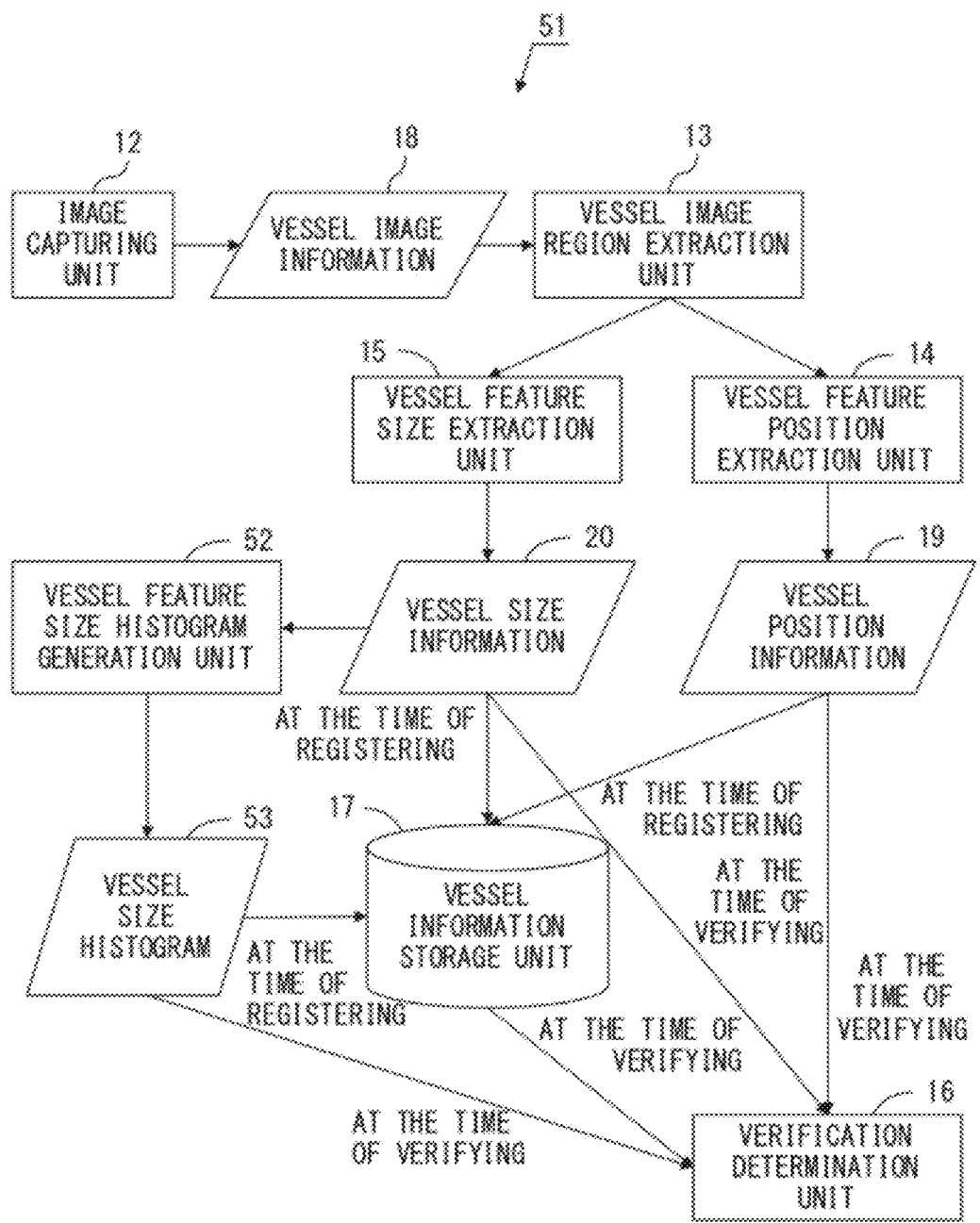
F I G. 14

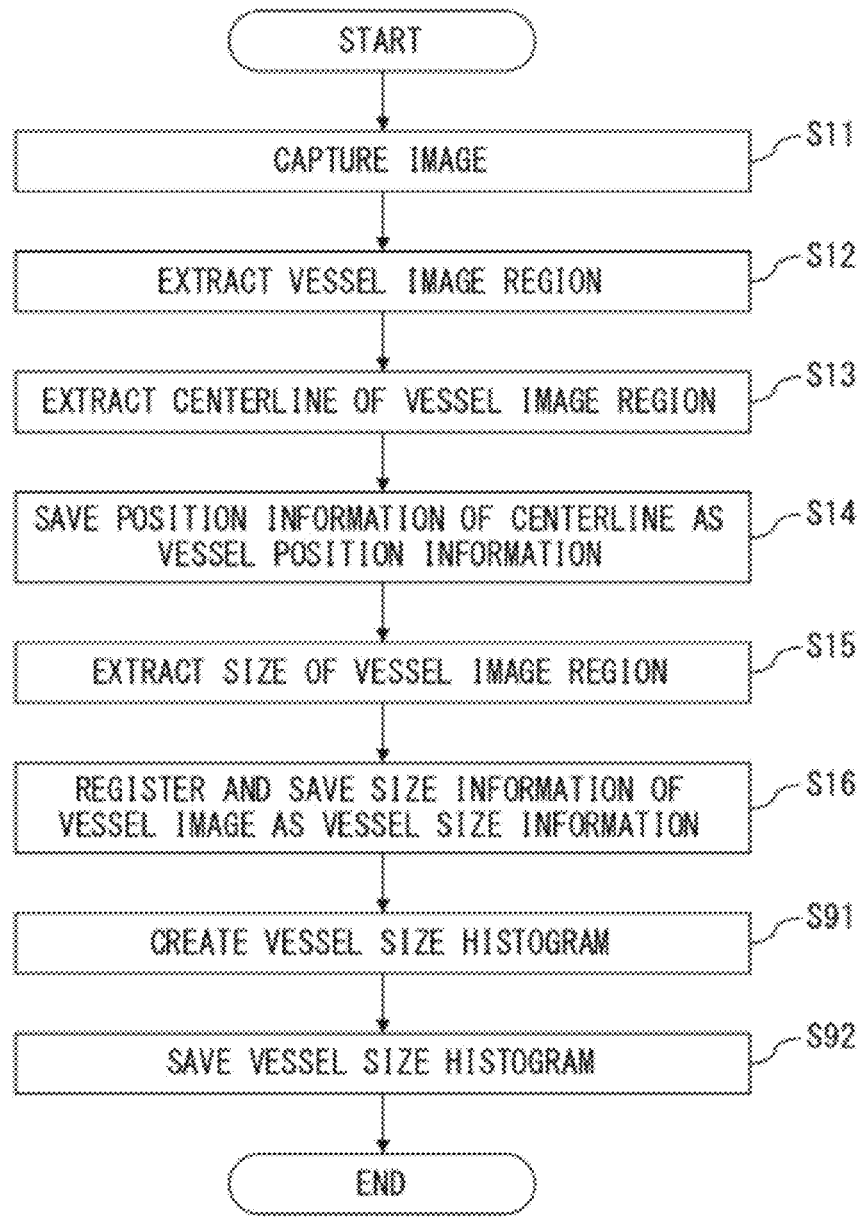
F I G. 16

$$w1 \times \sum_{i=(ir\max-ti\max)}^{255-ir\max} |HR(i) - TI(i-(ir\max-ti\max))| + w2 \times \sum_{i<(ir\max-ti\max)} HR(i)$$

..... FORMULA 1

FIG. 18

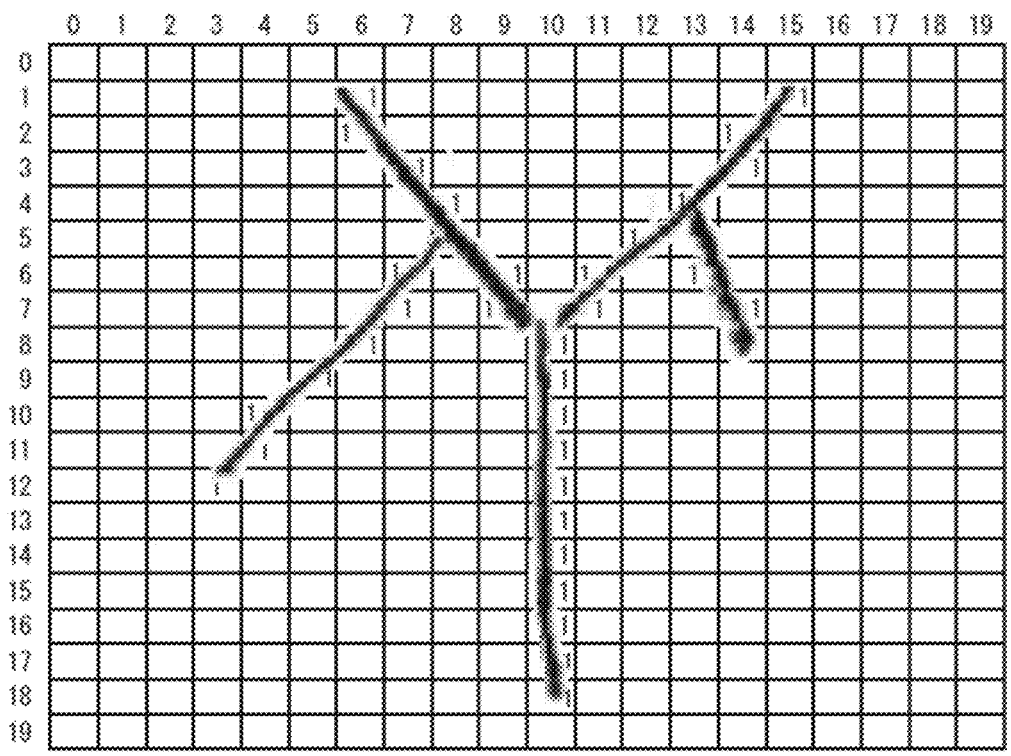
F I G. 19

REGISTERED VESSEL INFORMATION

| | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 | | | | | | | | | | | | | | | | | | | | |
| 1 | | | | | | | | 10 | | | | | | | | 5 | | | | |
| 2 | | | | | | | | 10 | | | | | | | 5 | | | | | |
| 3 | | | | | | | | | 10 | | | | | | 5 | | | | | |
| 4 | | | | | | | | | | 10 | | | | 5 | | | | | | |
| 5 | | | | | | | | | | 10 | | | | 5 | 3 | | | | | |
| 6 | | | | | | | | 2 | | | 10 | | 5 | | 3 | | | | | |
| 7 | | | | | | | | 2 | | | 10 | | 5 | | 3 | | | | | |
| 8 | | | | | | | 2 | | | | 6 | | | | 3 | | | | | |
| 9 | | | | | | 2 | | | | | 6 | | | | | | | | | |
| 10 | | | | | 2 | | | | | | 6 | | | | | | | | | |
| 11 | | | | | 2 | | | | | | 6 | | | | | | | | | |
| 12 | | | | | | | | | | | 6 | | | | | | | | | |
| 13 | | | | | | | | | | | 6 | | | | | | | | | |
| 14 | | | | | | | | | | | 6 | | | | | | | | | |
| 15 | | | | | | | | | | | 6 | | | | | | | | | |
| 16 | | | | | | | | | | | 6 | | | | | | | | | |
| 17 | | | | | | | | | | | 6 | | | | | | | | | |
| 18 | | | | | | | | | | | 6 | | | | | | | | | |
| 19 | | | | | | | | | | | | | | | | | | | | |

F I G. 20

VERIFICATION VESSEL INFORMATION ON A PERSON

|    | 0 | 1 | 2 | 3 | 4 | 5 | 6 | 7 | 8 | 9 | 10 | 11 | 12 | 13 | 14 | 15 | 16 | 17 | 18 | 19 |
|----|---|---|---|---|---|---|---|---|---|---|----|----|----|----|----|----|----|----|----|----|
| 0  |   |   |   |   |   |   |   |   |   |   |    |    |    |    |    |    |    |    |    |    |
| 1  |   |   |   |   |   |   | 7 |   |   |   |    |    |    |    |    | 2  |    |    |    |    |
| 2  |   |   |   |   |   |   | 7 |   |   |   |    |    |    |    | 2  |    |    |    |    |    |
| 3  |   |   |   |   |   |   |   | 7 |   |   |    |    |    |    | 2  |    |    |    |    |    |
| 4  |   |   |   |   |   |   |   |   | 7 |   |    |    |    | 2  |    |    |    |    |    |    |
| 5  |   |   |   |   |   |   |   |   | 7 |   |    |    | 2  |    |    |    |    |    |    |    |
| 6  |   |   |   |   |   |   |   |   |   | 7 |    | 2  |    |    |    |    |    |    |    |    |
| 7  |   |   |   |   |   |   |   |   |   | 7 |    | 2  |    |    |    |    |    |    |    |    |
| 8  |   |   |   |   |   |   |   |   |   |   | 3  |    |    |    |    |    |    |    |    |    |
| 9  |   |   |   |   |   |   |   |   |   |   | 3  |    |    |    |    |    |    |    |    |    |
| 10 |   |   |   |   |   |   |   |   |   |   | 3  |    |    |    |    |    |    |    |    |    |
| 11 |   |   |   |   |   |   |   |   |   |   | 3  |    |    |    |    |    |    |    |    |    |
| 12 |   |   |   |   |   |   |   |   |   |   | 3  |    |    |    |    |    |    |    |    |    |
| 13 |   |   |   |   |   |   |   |   |   |   | 3  |    |    |    |    |    |    |    |    |    |
| 14 |   |   |   |   |   |   |   |   |   |   | 3  |    |    |    |    |    |    |    |    |    |
| 15 |   |   |   |   |   |   |   |   |   |   | 3  |    |    |    |    |    |    |    |    |    |
| 16 |   |   |   |   |   |   |   |   |   |   | 3  |    |    |    |    |    |    |    |    |    |
| 17 |   |   |   |   |   |   |   |   |   |   | 3  |    |    |    |    |    |    |    |    |    |
| 18 |   |   |   |   |   |   |   |   |   |   | 3  |    |    |    |    |    |    |    |    |    |
| 19 |   |   |   |   |   |   |   |   |   |   |    |    |    |    |    |    |    |    |    |    |

FIG. 21

VERIFICATION VESSEL INFORMATION ON ANOTHER PERSON

|   | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|----|----|----|----|----|----|----|----|----|----|
| 0 |   |   |   |   |   |   |   |   |   |   |    |    |    |    |    |    |    |    |    |    |
| 1 |   |   |   |   |   |   |   |   |   |   |    |    |    |    |    |    |    |    |    |    |
| 2 |   |   |   |   |   |   |   |   |   |   |    |    |    |    |    |    |    |    |    |    |
| 3 |   |   |   |   |   |   |   |   |   |   |    |    |    |    |    |    |    |    |    |    |
| 4 |   |   |   |   |   |   |   |   |   |   |    |    |    |    |    |    |    |    |    |    |
| 5 |   |   |   |   |   |   |   |   | 8 |   |    |    |    | 5  | 4  |    |    |    |    |    |
| 6 |   |   |   |   |   |   |   | 5 |   |   | 8  |    | 5  |    | 4  |    |    |    |    |    |
| 7 |   |   |   |   |   |   |   | 5 |   |   | 8  |    | 5  |    | 4  |    |    |    |    |    |
| 8 |   |   |   |   |   |   | 5 |   |   |   | 8  |    |    |    | 4  |    |    |    |    |    |
| 9 |   |   |   |   |   | 5 |   |   |   |   | 3  |    |    |    |    |    |    |    |    |    |
| 10 |  |   |   |   | 5 |   |   |   |   |   | 3  |    |    |    |    |    |    |    |    |    |
| 11 |  |   |   |   | 5 |   |   |   |   |   | 3  |    |    |    |    |    |    |    |    |    |
| 12 |  |   |   |   |   |   |   |   |   |   | 3  |    |    |    |    |    |    |    |    |    |
| 13 |  |   |   |   |   |   |   |   |   |   | 3  |    |    |    |    |    |    |    |    |    |
| 14 |  |   |   |   |   |   |   |   |   |   | 3  |    |    |    |    |    |    |    |    |    |
| 15 |  |   |   |   |   |   |   |   |   |   | 3  |    |    |    |    |    |    |    |    |    |
| 16 |  |   |   |   |   |   |   |   |   |   | 3  |    |    |    |    |    |    |    |    |    |
| 17 |  |   |   |   |   |   |   |   |   |   | 3  |    |    |    |    |    |    |    |    |    |
| 18 |  |   |   |   |   |   |   |   |   |   | 3  |    |    |    |    |    |    |    |    |    |
| 19 |  |   |   |   |   |   |   |   |   |   |    |    |    |    |    |    |    |    |    |    |

FIG. 22

BIOMETRIC AUTHENTICATION APPARATUS AND BIOMETRIC AUTHENTICATION METHOD

CROSS-REFERENCE TO RELATED APPLICATIONS

This application is a continuation application of International Application PCT/JP2010/001717 filed on Mar. 10, 2010 and designated the U.S., the entire contents of which are incorporated herein by reference.

FIELD

The present invention relates to a biometric authentication apparatus and a biometric authentication method.

BACKGROUND

In biometric authentication relying on a vessel pattern of a living body, images of body sites such as a palm, the back of a hand, and a finger are captured using, for example, near infrared rays. Reduced hemoglobin contained in the vein absorbs near infrared rays, and the vein portion thus appears darker than other portions around this portion. Accordingly, digital image processing extracts a dark portion and extracts a pattern shown by dark lines corresponding to the vessels as a vessel pattern, which is used as information to identify a person. A vessel pattern of a person is registered in advance; when authentication is performed, a vessel pattern of a person to be authenticated is read, and this vessel pattern is verified against the vessel pattern registered in advance to perform authentication.

Meanwhile, a technology is known for non-invasively measuring hemoglobin concentration using the near-infrared spectroscopic imaging method (e.g., non-patent document 1).

A biometric authentication sensor based on a vessel pattern typically has a certain sensing level with respect to the thickness and the size of a vessel image in accordance with a resolution achieved by an image capturing unit and the performance of digital image processing for extracting a dark line from the obtained image. When the vessel at a certain portion indicates a level that is equal to the sensing level of the sensor or lower due to a low temperature, the presence of the vessel at this portion may possibly not be sensed.

A technology is known wherein authentication is performed in accordance with the combination of the fingerprint and the vessel, and, in vessel authentication, characteristics are extracted in consideration of the distribution of and connection between the sizes of vessel patterns.

A technology is known wherein, when the quality of a read image of biometric information is bad, image processing is performed for improving the quality of the read image during authentication processing.

An identification device relying on digital veins is provided with a second light source that emits light to be reflected from a finger and to be incident on an imaging part in order to decrease identification errors such as an error in inserting a finger and an error caused by deformation of a finger. A technology is known for determining whether or not the vessel pattern of an image captured using light from the second light source is clear.

In regard to an in-vehicle fingerprint authentication apparatus, it is known that means is provided for generating a correction value for a fingerprint image signal in accordance with an ambient temperature.

In regard to a biometric authentication device that performs authentication using blood vessel images of a living body, it is known that the temperatures of the living body at the time of registering and the time of collating are detected and that, when a collation error occurs, the cause of the error is estimated from the difference between the temperature at the time of registering and the temperature at the time of collating.

In regard to an authentication apparatus that authenticates a person using a fingerprint, it is known that a temperature and humidity at the time of authenticating are measured and an identification threshold or a forgery threshold to be used for authentication is set in accordance with a temperature or humidity.

In regard to a biometric authentication apparatus that specifies an individual by use of a facial image, a technology is known wherein it is determined which of a plurality of environmental sections the environment for inputting the facial image corresponds to, and, in accordance with the learning frequency of dictionary information at the environmental section at the time of inputting, learning is performed.

SUMMARY

According to an aspect of the embodiment, a biometric authentication apparatus includes: an image capturing unit that captures a verification vessel image of a person to be authenticated; and an authentication unit that verifies verification vessel position information of the verification vessel image of the person to be authenticated as captured by the image capturing unit against registered vessel position information of a registered vessel image registered in advance, and that performs authentication using vessel size information of the registered vessel image which is registered in advance when the verification vessel position information is not identical with the registered vessel position information.

The object and advantages of the invention will be realized and attained by means of the elements and combinations particularly pointed out in the claims.

It is to be understood that both the foregoing general description and the following detailed description are exemplary and explanatory and are not restricted of the invention, as claimed.

BRIEF DESCRIPTION OF DRAWINGS

FIG. 1 illustrates a configuration of a biometric authentication apparatus in accordance with a first embodiment;

FIGS. 6A-6B illustrate examples in which vessel images are not identical with each other;

FIG. 7 illustrates a configuration of a biometric authentication apparatus in accordance with a second embodiment;

FIG. 10 illustrates a configuration of a biometric authentication apparatus in accordance with a third embodiment.

FIG. 14 illustrates a configuration of a biometric authentication apparatus in accordance with a fifth embodiment.

FIG. 16 is a flowchart illustrating a registration process in accordance with the fifth embodiment;

FIG. 18 illustrates a calculating formula for calculation of an evaluation value;

FIG. 19 illustrates a data configuration of vessel position information;

FIG. 20 illustrates a data configuration of registered vessel information;

FIG. 21 illustrates a data configuration of verification vessel information of a person; and FIG. 22 illustrates a data configuration of verification vessel information of another person.

DESCRIPTION OF EMBODIMENTS

Figure 2:
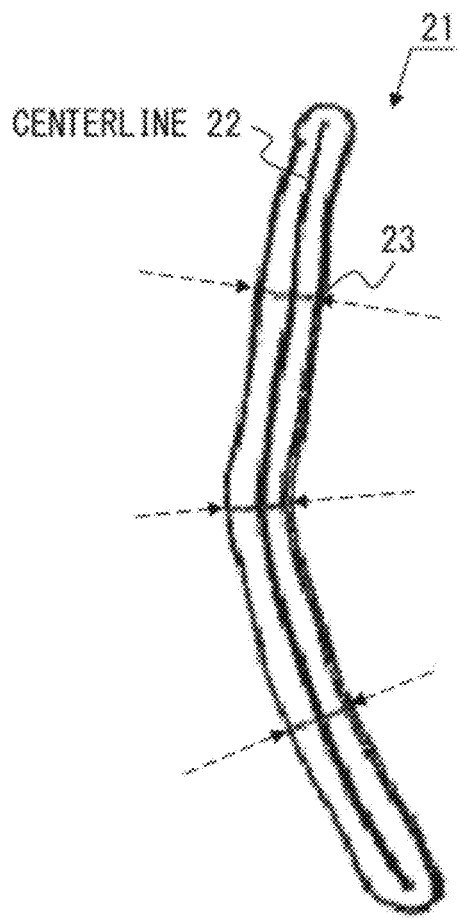
FIG. 2 is an explanatory diagram illustrating a calculation method for calculating a vessel position and the size of the vessel.

FIG. 1 illustrates a configuration of a biometric authentication apparatus 11 in accordance with a first embodiment. The biometric authentication apparatus 11 includes an image capturing unit 12, a vessel image region extraction unit 13, a vessel characteristic position extraction unit 14, a vessel characteristic size extraction unit 15, a verification determination unit 16, and a vessel information storage unit 17.

The image capturing unit 12, which includes, for example, a sensor to sense the wavelength of a near infrared ray, irradiates living body sites such as a palm, the back of a hand, and a finger with near infrared light having the wavelength of the near infrared ray and receives light from the living body to obtain a vessel image. By capturing an image with a near infrared ray, the image capturing unit 12 outputs vessel image information 18 that indicates a vessel portion that appears darker than the other portions.

To illuminate a living body site with a near infrared ray, a method may be used in which the living body site is irradiated with light from a direction facing this living body site. Such an illumination is readily performed when the living body site is a palm or the back of a hand. In the case of a method in which a living body site is irradiated with light from an area around this living body site, a finger could be readily irradiated. The finger could be irradiated with light from, for example, the back or side of the finger.

Using a technology such as binarization, the vessel image region extraction unit 13 extracts, from vessel image information 18, a region indicating relatively low brightness in comparison with other regions around this region as a vessel image region.

In the case of vessel image information obtained by capturing the image of a living body site with a near infrared ray, a vessel portion appears darker than other portions around this vessel portion. A method for extracting a vessel image region may be a method relying on binarization. As an example, with reference to a certain value determined in advance, a pixel region indicating a value equal to or lower than this certain value is defined as a vessel image region. Another method may be a method relying on an edge. An image is scanned in the positive X-axis direction and the positive Y-axis direction of coordinate axes, determining, between positive adjacent pixels, a pixel of increasing or decreasing brightness by at least a value determined in advance. The former pixel is defined as a positive edge and the latter pixel is defined as a negative edge. A region sandwiched between the positive edge and the negative edge in the positive direction of a coordinate axis is defined as a vessel image region. As a method for determining an edge, a technique to extract a portion indicating a change in brightness may be typically used, such as a method using a Gaussian operator or a method using a Gabor filter.

The vessel characteristic position extraction unit 14 calculates the position of a vessel image region extracted by the vessel image region extraction unit 13 and outputs the calculated position information to the vessel information storage unit 17 and the verification determination unit 16 as vessel position information 19. As an example, in an embodiment, the coordinates of a centerline of a vessel image region are calculated, and the calculated coordinates of the centerline are used as the vessel position information 19. The vessel position information 19 is not limited to the centerline of a vessel but may be position information of the outline or position information of a specific line of a vessel image region.

The vessel characteristic size extraction unit 15 defines, as vessel size information 20, a distance oriented in a direction perpendicular to the centerline of a vessel image region or the number of pixels arranged in a direction perpendicular to the centerline of a vessel image region and outputs this vessel size information 20 to the vessel information storage unit 17. As an example, twice the distance extending in a normal-line direction of the medial axis of a vessel image region from the medial axis to a boundary is defined as the size of the vessel.

As an example, as a method for determining a medial axis of a region, Blum's medial axis transform is known (e.g., Masahiko YACHIDA, "Robot Vision", SHOKODO, 1990, page 95). For each point within a vessel image region, the shortest distance to the boundary of the region is determined. The points with two or more points on the boundary providing the shortest distance are defined as a centerline. A method for determining a centerline is also described by "A. Rosenfeld and J. L. Pfalz: Distance functions on digital pictures, Pattern Recognition, Vol. 1, pp. 471-494, 1966".

When, for example, Blum's medial axis transform is used to extract a centerline of a vessel image region, twice the shortest distance to the boundary of the region represents the size of the vessel.

FIG. 2 illustrates the centerline and size of a vessel. When a vessel image region 21 is obtained, a centerline 22 of this region is obtained using, for example, Blum's centerline transform method. The shortest distance from the centerline 22 to a boundary 23 of the vessel image region 21 is then calculated, and twice the calculated value is defined as vessel size information.

Referring to FIG. 1 again, the vessel information storage unit 17 stores in advance vessel information including a registrant's vessel position information 19 and vessel size information 20. In one example, a value indicating the size of a vessel is associated with a pixel including a vessel characteristic and stored as image format data, and 0 is stored for a pixel not including a vessel. The portions of the image format data not indicating 0 as a value corresponding to a pixel indicate the position and the size of a vessel. To store the same amount of data, a pixel of a vessel may be defined as a component point, and a set of three values, the x-coordinate of the component point, the y-coordinate of the component point, and a value indicating the size, may be stored as array form data.

The vessel information storage unit 17 does not need to be provided within the biometric authentication apparatus 11 but may be provided at an external storage apparatus so that registered vessel information and the like can be obtained from this external storage apparatus via, for example, a communication line.

To decrease the amount of data stored in the vessel information storage unit 17, the vessel position information 19 and the vessel size information 20 are stored in units of line segments. That is, when lines of a vessel image are divided at separation points and a pixel adjacent to one pixel is represented in an eight-adjacent form within component points of the medial axis of the vessel image, a point with three or more adjacent pixels is defined as a separation point. In a method for decreasing the amount of data for a line segment, the average of values indicating the sizes of all pixels on the line segment is saved as a representative value of the size of the vessel. Alternatively, each line segment is approximated as a straight line and position information of the line segment is represented by two points, the start point and the end point, and is saved in the vessel information storage unit 17 as vessel position information.

The verification determination unit 16 normalizes vessel position information as necessary before a matching process. When an image of a fixed living body site is captured, e.g., when the image is captured while a hook attached to the apparatus being clasped, the relative relationship between the site to be captured and the apparatus is always made to be constant, and hence coordinates do not need to be normalized. Meanwhile, when a living body site is not fixed, a characteristic portion such as a fingertip is extracted from the silhouette of the living body so that the same portion of the living body site can be observed, and a captured image is enlarged, reduced, or translated to be capable of observing the characteristic portion with the same portion of the image.

In a matching process, the verification determination unit 16 verifies vessel information registered in advance against vessel information to be verified. As an example, in the case of vessel information represented in an image format, the matching process is performed by superimposing registered vessel information and verification vessel information to investigate a superposition relationship between pixels. When coordinates of component points of a vessel image are represented by values, the matching process is performed by searching for vessel information with the same coordinates. When the vessel position information 19 is represented by the start point and the end point of a line segment, the matching process is performed by searching for a line segment including the same start point and end point from registered vessel information.

When coordinates of component points of a vessel image are represented by values or when line segments are represented by start points and end points, data may be transformed into image format data and the same method as the matching process for vessel information for an image format may be performed.

In consideration of the influence of an error in the position at which a vessel image is extracted, even when component points of the center of the vessel image or the coordinates of line segments are not completely identical, an image with a coordinate difference between component points or between start points and endpoints (the sum of the differences between x-coordinates and between y-coordinates) that is equal to or lower than a certain value is judged to be the same image. Alternatively, an image with a Euclid distance for the x-coordinate and the y-coordinate that is within the range of a certain value is judged to be the same vessel image.

Next, descriptions will be given of processes performed by the biometric authentication apparatus 11 in accordance with the first embodiment when a vessel image is registered and when a vessel image is verified. The first embodiment is an example for performing 1-to-1 authentication, but the first embodiment may be applied to 1-to-N authentication. The following processes in the first embodiment and another embodiment are achieved by a software module or hardware of the biometric authentication apparatus 11.

The disclosed biometric authentication apparatus may decrease authentication errors caused by a low temperature.

Figure 3:
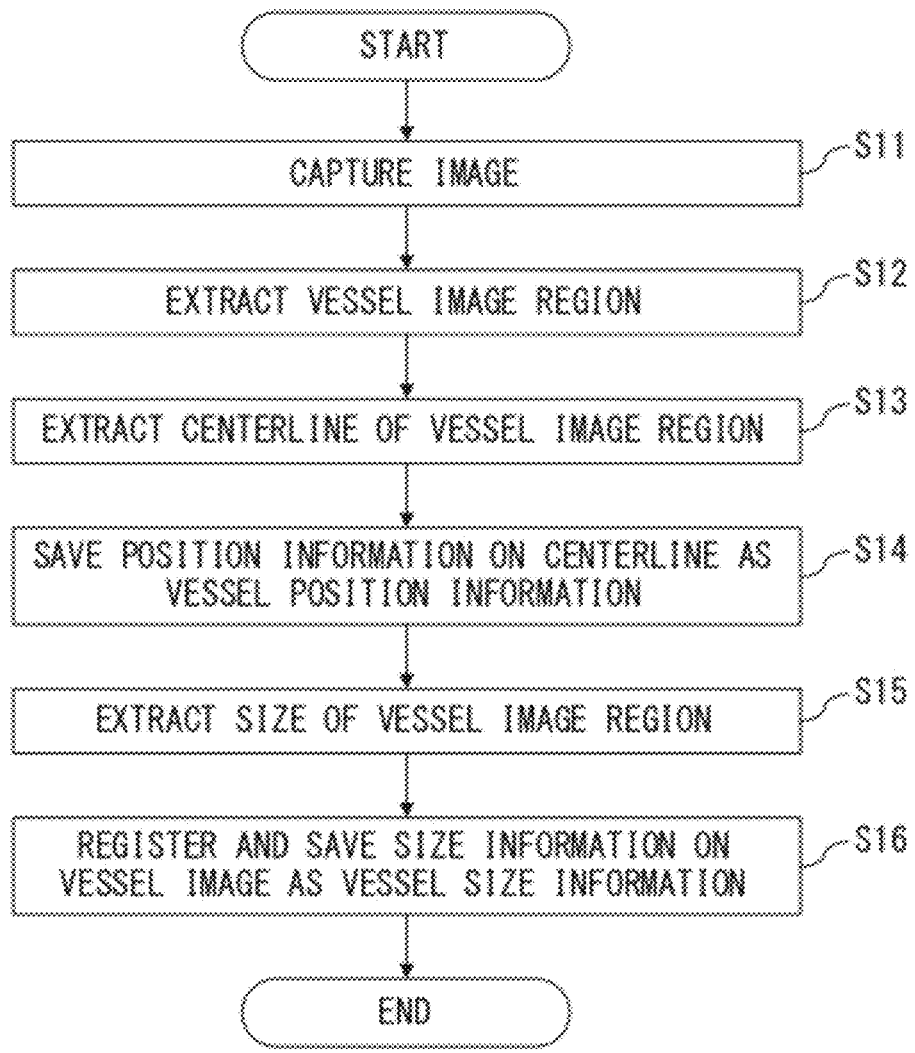
FIG. 3 is a flowchart illustrating a registration process in accordance with the first embodiment.

FIG. 3 is a flowchart illustrating detailed processes at the time of registering a vessel image in the first embodiment.

An image captured by the image capturing unit 12 is saved in a storage unit such as a memory (S11). A vessel image region is then extracted from the captured image (S12).

Next, a centerline of the vessel image region is extracted (S13). In step S13, the centerline may be extracted using, for example, the aforementioned medial axis transform by Blum.

Next, position information of the extracted centerline of the vessel image region is saved in a storage unit as vessel position information 19 (S14). As an example, in step S14, the vessel characteristic position extraction unit 14 outputs the position information of the centerline of the vessel image region to the vessel information storage unit 17, which stores the position information as vessel position information 19 on a registrant.

Next, the size of the vessel image region is extracted (S15). As an example, in step S15, the distance from the centerline to a boundary of the vessel image region is calculated, and twice the distance is calculated as the size.

Next, the extracted size information of the vessel image is saved in a storage unit as registered vessel size information (S16). As an example, in step S16, the vessel characteristic size extraction unit 15 outputs vessel size information 20 to the vessel information storage unit 17, which associates the vessel size information 20 with registered vessel position information and stores these pieces of associated information.

With reference to the flowchart of FIG. 4, descriptions will be given of details of processes performed in performing verification against a captured vessel image after registered vessel information including vessel position information 19 and vessel size information 20 is registered as described above.

An image of a living body site to be verified, such as a finger or palm, is captured (S21). Next, a vessel image region of the captured vessel image is extracted (S22).

Next, a centerline of the vessel image region is extracted, and position information of the extracted centerline is saved in a storage unit such as a memory as verification vessel position information (S23).

Next, registered vessel information (or vessel position information and vessel size information) registered in advance is obtained from a vessel information storage unit (S24).

Next, matching is performed between verification vessel information and registered vessel information (S25). As an example, in step S25, it is determined whether or not the coordinates of a plurality of component points which are verification vessel position information and the coordinates of a plurality of component points which are registered vessel position information are identical with each other.

Next, it is determined whether or not there is a piece of verification vessel position information that does not conform to registered vessel position information (S26).

When there is a piece of verification vessel position information that is not identical with registered vessel position information (YES in S26), the process proceeds to step S28, where a judgment of "authentication BG" is indicated. A situation in which there is a piece of verification vessel position information that does not conform to registered vessel position information means that the verification vessel image is not included in the registered vessel information, and hence a judgment of "authentication NG" is indicated in this situation.

In steps S26 and S28, when, for example, the coordinates of component points that are pixels of a vessel image are compared as vessel position information, the coordinates of each component point of a plurality of pieces of registered vessel information are compared with the coordinates of each component point of verification vessel information. When there is a coordinate that is present in only verification vessel position information, the image is judged to be different from the registered vessel image.

When there is no piece of verification vessel position information that is not identical with registered vessel position information (NO in S26), the process proceeds to step S27, where it is determined whether or not there is a piece of registered vessel position information that does not conform to verification vessel position information. The process performed in step S28 is a process for determining whether or not there is a vessel that is present in a registered vessel image but is not present in a verification vessel image due to, for example, vasoconstriction caused by a low temperature.

When there is no piece of registered vessel position information that does not conform to verification vessel position information (NO in S28), i.e., when the verification vessel image and the registered vessel image are completely identical with each other, the process proceeds to step S32, where a judgment of "authentication OK" is indicated.

Meanwhile, when there is a piece of registered vessel position information that does not conform to verification vessel position information (YES in S28), the process proceeds to step S29, where a size TRm (corresponding to a first size) of a registered vessel image with position information that is identical with verification vessel position information is calculated or obtained.

Next, a size TRnm (corresponding to a second size) of a registered vessel image with position information that is not identical with verification vessel position information is calculated or obtained (S30).

Next, it is determined whether or not the size TRm of the registered vessel image with the identical position information and the size TRnm of the registered vessel image with the not-identical position information satisfy TRm≥TRnm (S31).

When TRm≥TRnm is not satisfied (NO in S31), the process proceeds to step S27, where a judgment of "authentication NG" is indicated.

Meanwhile, when TRm≥TRnm is satisfied (YES in S31), the process proceeds to step S32, where a judgment of "authentication OK" is indicated.

The processes of steps S28 to S32 and step S27 are for performing authentication in consideration of the influence of vasoconstriction caused by a low temperature. When, for example, the size TRnm of a registered vessel image with identical position information is as great as or greater than the size TRnm of a registered vessel image with not-identical position information, it is determined that the position information of the vessel has become not-identical due to vasoconstriction caused by a low temperature at the time of verifying. In this case, since there is no verification vessel position information that does not conform to registered vessel position information, a judgment of "authentication OK" is indicated. Meanwhile, when the size TRnm of the registered vessel image with identical position information is less than the size TRnm of the registered vessel image with not-identical position information, it is determined that the situation is not caused by vasoconstriction, indicating a judgment of "authentication NG".

Here, the determination of an inclusion relationship of vessel position information and the determination of the size of a vessel in the aforementioned matching process will be described.

Let AR be a set of registered vessel information, and let AT be a set of verification vessel information. When vessel information is represented as a set of component points and when the set AR is composed of MR points, component points of registered vessel information are represented as PR(1), PR(2), PR(3), ..., PR(NR). When the set AI of verification vessel information is composed of NI points, component points of verification vessel information are represented as PI(1), PI(2), PI(3), ..., PI(NI).

Assume that there are NIm points within verification vessel information that are identical with registered vessel information and that there are NInm points within verification vessel information that are not identical with registered vessel information (NInm=Ni−NIm).

It is determined whether or not verification vessel information is a subset of registered vessel information by, for example, determining whether or not NInm, the number of component points with not-identical vessel position information, is equal to or less than a certain value. Alternatively, the determination may be made by determining whether or not the value obtained by dividing the number of not-identical component points NInm by the number of all component points NR, i.e., NInm/(NR), is equal to or less than a threshold determined in advance.

When vessel information is represented as a set of line segments to determine whether or not line segments are identical according to the coordinates of the start point and the end points, an inclusion relationship of the set may be determined by calculating the number of identical line segments.

Next, descriptions will be given of a process for determining the size of a vessel. Let AR be a set of component points of the vessel image of registered vessel information, and let AI be a set of component points of the vessel image of verification vessel information.

When vessel information is represented as a set of component points, assume that the set AR is composed of NR points, PR(1), PR(2), PR(3), ..., PR(N) and that the sizes at these points are respectively TR(PR(1)), TR(PR(2)), TR(PR(3)), ..., TR(PR(NR)). PR(1) to PR(NR) indicate the positions of component points of the vessel. Also assume that the set AI is composed of NI points, PI(1), PI(2), PI(3), PI(NI) and that the sizes at these points are respectively TI(PI(1)), TI(PI(2)), TI(PI(3)), ..., TI(PI(NI)).

In addition, let ARm be the set of points within the component points of registered vessel information that are identical with verification vessel information and let ARnm be the set of points within the component points of registered vessel information that are not identical with verification vessel information. The set ARm is composed of NRm points and the set ARnm is composed of NRnm points (NRnm=NR−NRm).

In this case, it may be determined as follows whether or not the size of the vessel of a registered vessel image with position information that is identical with verification vessel position information is greater than the size of a registered vessel image with position information that is not identical with verification vessel position information.

Let TRm-min be the minimum value of the sizes of the component points included in the set Arm of registered vessel information with position information that is identical with verification vessel information. Let TRnm-max be the maximum value of the sizes of the component points included in the set ATnm of registered vessel information with position information that is not identical with verification vessel information.

The sizes of the registered vessel image and the verification vessel image may be determined in accordance with whether or not "TRm-min−TRnm-max" is equal to or higher than a threshold determined in advance.

Moreover, let ARm-ave be the average value of the sizes of the points included in the set ARm, and let ARnm-ave be the average value of the sizes included in the set ARnm. The sizes may be statistically determined by determining whether or not "TRnm-ave−TRm-ave" is equal to or higher than a threshold determined in advance.

In consideration of a measurement error, when the points of the set ARm include NRnm-thik points having a size that is equal to or greater than TRm-min, NRnm-thik is divided by the number of all of the component points, NR. The determination may be made in accordance with whether or not the value obtained via the division, NRnm-thik/NR, is equal to or lower than a threshold determined in advance.

FIG. 5A to FIG. 5D illustrate a vessel image at the time of registering and a vessel image at the time of verifying (low temperature) and illustrate exemplary situations of characteristic extractions from these vessel images.

Figure 5A:
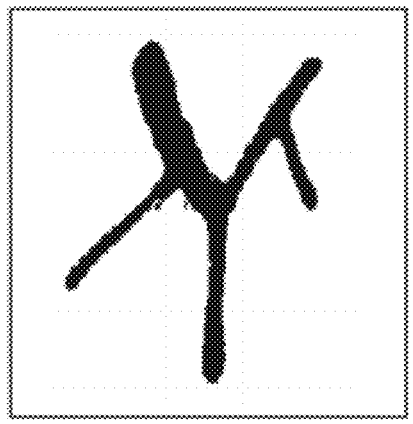
FIGS. 5A-5D illustrate examples of a vessel image.
Figure 5B:
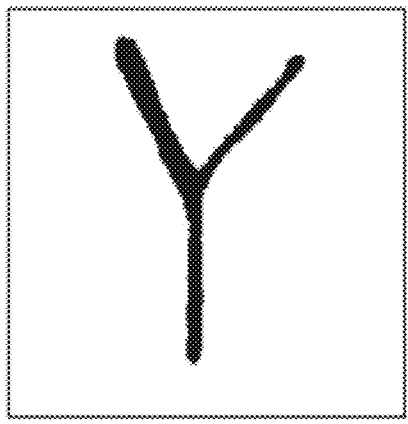

FIG. 5A illustrates an example of a vessel image of a finger at the time of registering, and FIG. 5B illustrates an example of a vessel image at a low temperature. When it is cold, the vessel image is partially lost due to vasoconstriction as illustrated in FIG. 5B.

Figure 5C:
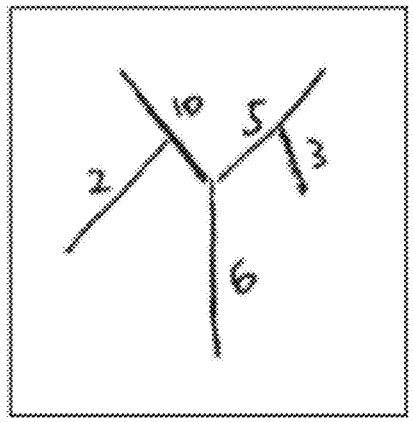
Figure 5D:
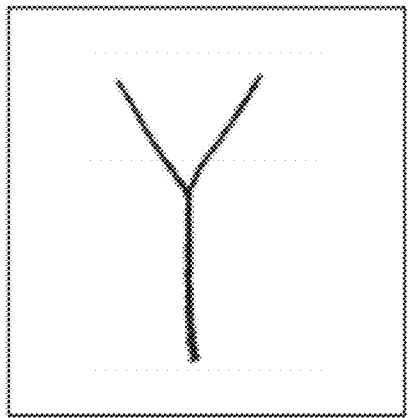

FIG. 5C illustrates centerlines and sizes extracted from the vessel image at the time of registering, and FIG. 5D illustrates centerlines extracted from the vessel image obtained at a low temperature. Due to vasoconstriction caused by a low temperature, the centerlines of the vessel image in FIG. 5D are partially lost in comparison with the centerlines of the vessel image in FIG. 5C.

FIG. 6A and FIG. 6B illustrate centerlines extracted from another person's vessel image. FIG. 6A indicates an exemplary situation in which there is a centerline of a vessel image that is not present in the registered vessel image in FIG. 5C. In this case, since the verification vessel image illustrated in FIG. 6A is not a subset of the registered vessel image illustrated in FIG. 5C, the image in FIG. 6A is judged to be another person's vessel image.

FIG. 6B illustrates an exemplary situation in which the vessel image indicated by the dotted line b present in a registered vessel image is not present in a verification vessel image. In this case, the size of the registered vessel image in FIG. 5C corresponding to the dotted line b is "10", which is greater than the size of another registered vessel image that is identical with the verification vessel image. Accordingly, the verification vessel image in FIG. 6B is judged to be another person's vessel image.

According to the first embodiment described above, the size of a vessel may be examined to determine whether or not the inconsistency between verification vessel information and registered vessel information is resulting from vasoconstriction caused by a low temperature. Accordingly, it is possible to decrease authentication errors in which a person is mistakenly judged to be another person due to vasoconstriction caused by a low temperature.

FIG. 7 illustrates a configuration of a biometric authentication apparatus 31 in accordance with a second embodiment. In FIG. 7, like blocks are indicated by like numerals used in FIG. 1 and their descriptions will be left out. In the second embodiment, authentication is performed using size information of a vessel when the temperature at the time of registering is higher than the temperature at the time of authenticating.

A biometric authentication apparatus 31 includes an image capturing unit 12, a vessel image region extraction unit 13, a vessel characteristic position extraction unit 14, a vessel characteristic size extraction unit 15, a verification determination unit 16, a vessel information storage unit 17, a temperature measurement unit 32, and a temperature storage unit 33.

The temperature measurement unit 32 measures the temperature of a vessel image at the time of registering, outputs the measured temperature to the temperature storage unit 33, and measures and outputs the temperature at the time of authenticating to the verification determination unit 16. The temperature storage unit 33 stores the temperature at the time of registering by associating this temperature with registered vessel information.

As the temperature, room temperature, outdoor temperature, body temperature, or the like may be used. The temperature measurement unit 32 measures room temperature. To use outdoor temperature, the measured temperature is obtained from a temperature measurement unit 32, which is located outside. Alternatively, temperatures announced via a network by, for example, the Meteorological Agency may be referenced. To use body temperature, a surface thermometer, which measures the surface temperature of an object, is attached to the image capturing unit 12 to measure the surface temperature of a site to be authenticated.

Figure 8:
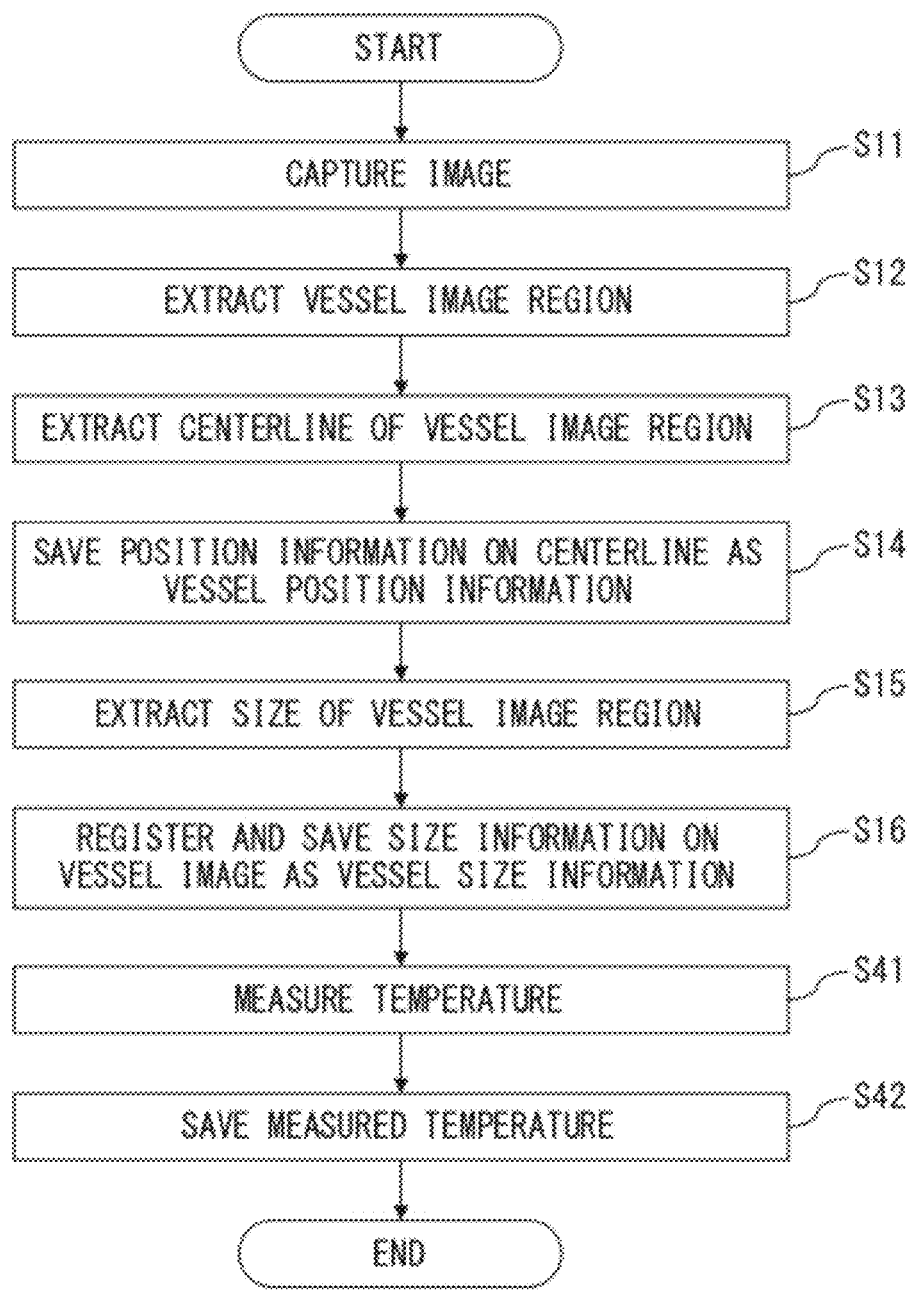
FIG. 8 is a flowchart illustrating a registration process in accordance with the second embodiment.

FIG. 8 is a flowchart illustrating detailed processes at the time of registering performed by the biometric authentication apparatus 31 in accordance with the second embodiment.

The processes of steps S11 to S16 in FIG. 8 are the same as those of steps S11 to S16 in FIG. 3. In steps S11 to S16, position information and size information of a vessel image to be registered are saved in the vessel information storage unit 17. Next, in step S41, the temperature of an environment or a site to be authenticated is measured. In step S42, the measured temperature is saved in the temperature storage unit 33.

Figure 9:
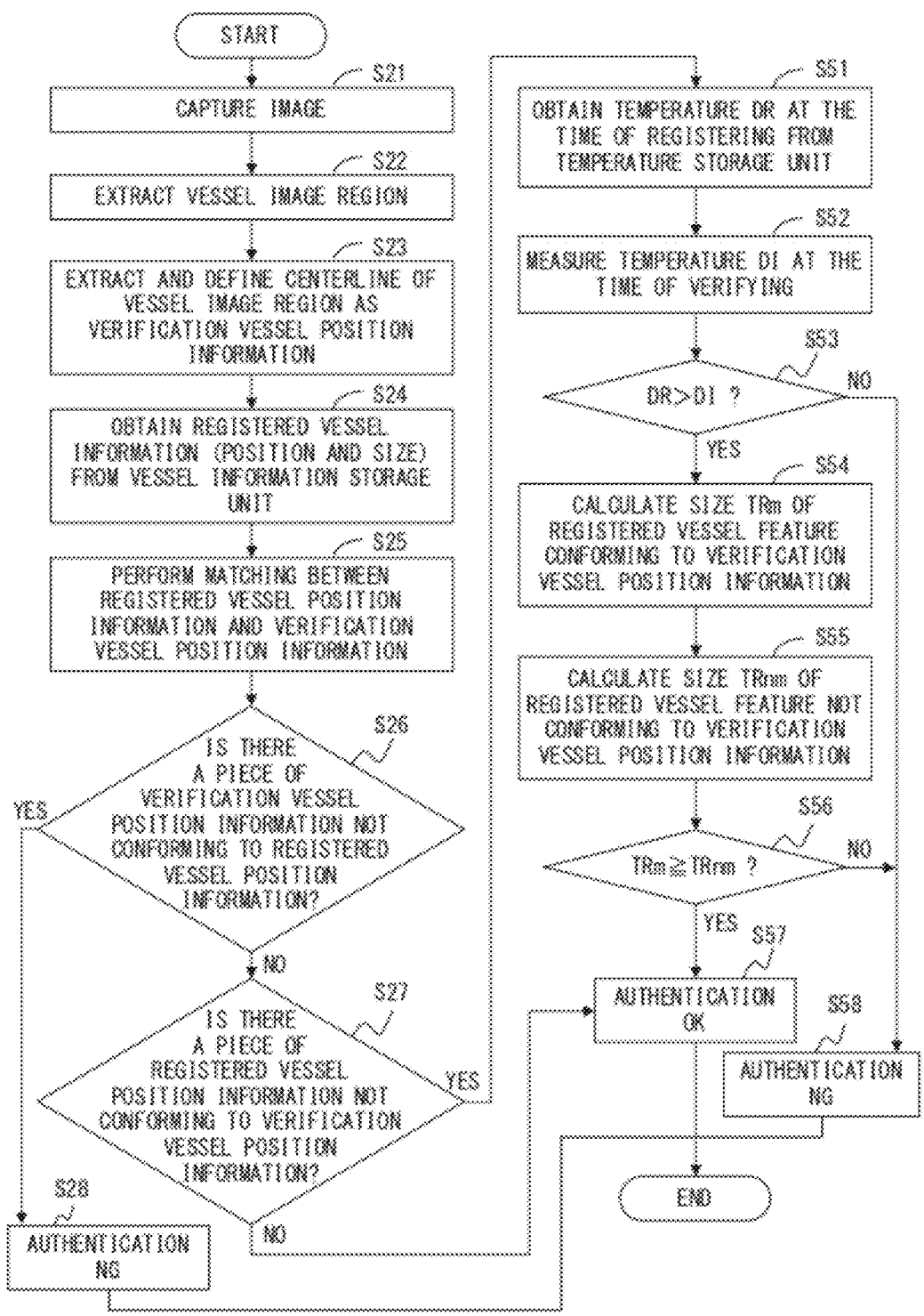
FIG. 9 is a flowchart illustrating a verification process in accordance with the second embodiment.

FIG. 9 is a flowchart illustrating detailed processes at the time of verifying in the second embodiment.

Figure 4:
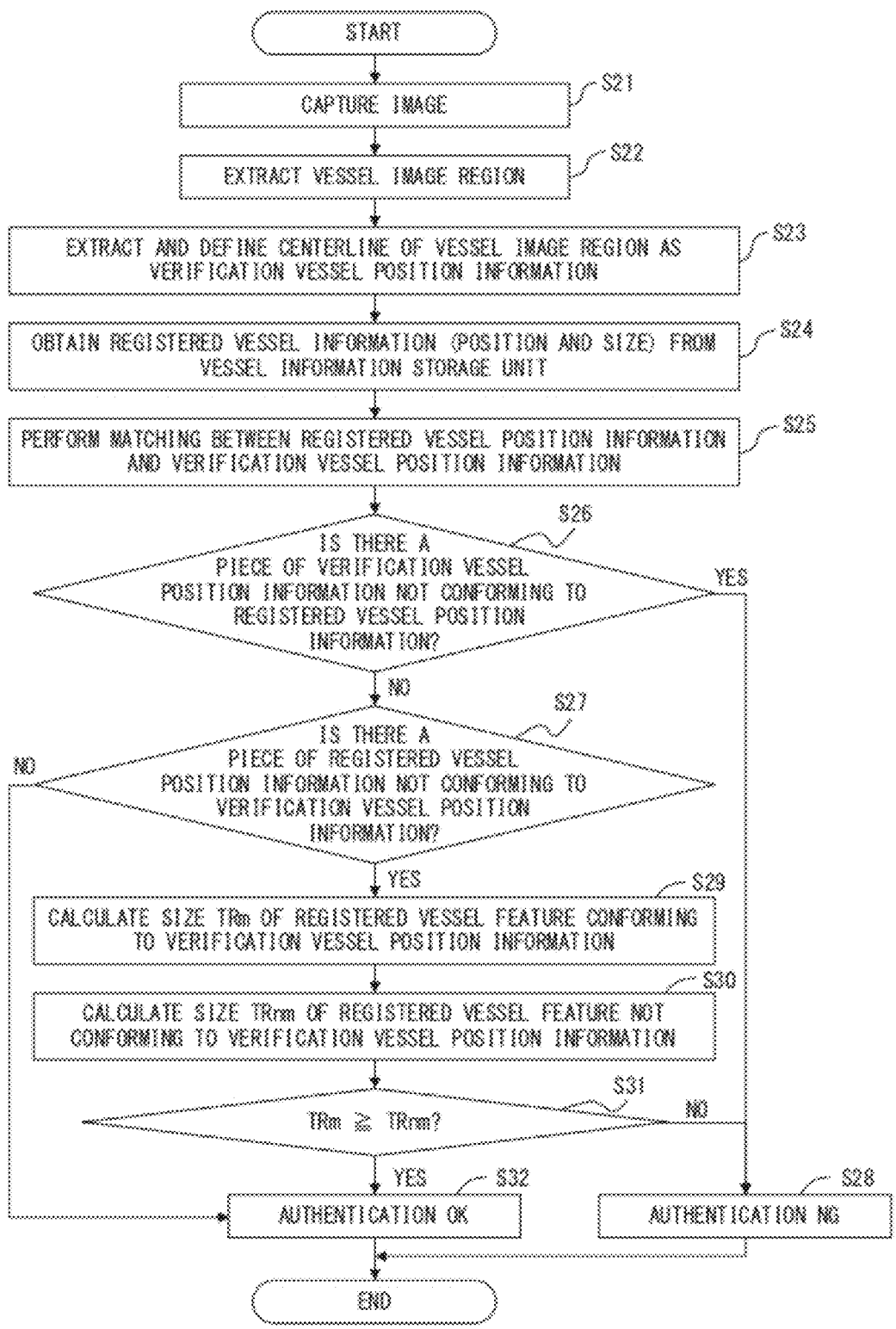
FIG. 4 is a flowchart illustrating a verification process in accordance with the first embodiment.

The processes of steps S21 to S28 in FIG. 9 are the same as those of steps S21 to S28 in FIG. 4. In steps S21 to S28, it is determined whether or not registered vessel position information conforms to verification vessel position information.

When there is a piece of registered vessel position information that does not conform to verification vessel position information (YES in S27), the process proceeds to step S51, where a temperature DR at the time of registering is obtained from the temperature storage unit 33. A temperature DI at the time of verifying is measured by the temperature measurement unit 32 (S52).

Next, it is determined whether or not the temperature DR at the time of registering is higher than the temperature DI at the time of verifying (DR>DI) (S53).

When the temperature DR at the time of registering is higher than the temperature DI at the time of verifying (YES in S53), the process proceeds to step S54, where a size TRm of a registered vessel characteristic (registered vessel information) with position information that is identical with verification vessel position information is calculated or obtained.

Next, a size TRnm of a registered vessel characteristic with position information that is not identical with verification vessel position information is calculated or obtained (S55).

Next, it is determined whether or not the size TRm of a registered vessel characteristic with position information that is identical with verification vessel position information is equal to or greater than the size TRnm of a registered vessel characteristic with not-identical position information (S56).

When the size TRn of the registered vessel information conforming to verification vessel position information is equal to or greater than the size TRnm of the non-conforming registered vessel image (YES in S56), the process proceeds to step S57, where a judgment of "authentication OK" is indicated. That is, when the size TRm of the registered vessel image with a temperature DR at the time of registering that is higher than the temperature at the time of authenticating and with position information that is identical with verification vessel information is equal to or greater than the size TRnm of the not-identical registered vessel image, these two images are judged to be the same.

When it is determined in step S53 that the temperature at the time of registering is lower than the temperature at the time of authenticating (NO in S53), it is determined that the inconsistency in vessel position information does not result from vasoconstriction, indicating a judgment of "authentication NG".

In step S56, when the size TRm of a registered vessel image conforming to verification vessel position information is less than the size TRnm of a registered vessel image with non-conforming position information (NO in S56), the process proceeds to step S58, where a judgment of "authentication NG" is indicated.

According to the second embodiment described above, when the temperature at the time of authenticating is lower than the temperature at the time of registering, the sizes of vessels may be compared to decrease authentication errors in which a person is mistakenly judged to be another person due to vasoconstriction caused by a low temperature. Meanwhile, the sizes of vessels are compared only when the temperature at the time of authenticating is lower than the temperature at the time of registering, and the sizes of vessels are not compared when the temperature at the time of authenticating is higher than the temperature at the time of registering, allowing an increase in the time required for the authentication process to be limited.

FIG. 10 illustrates a configuration of a biometric authentication apparatus 41 in accordance with a third embodiment. In the third embodiment, authentication is performed using information on both the position and size of a vessel. The third embodiment is an exemplary situation in which 1-to-N authentication is performed. In the following, like blocks are indicated by like numerals used in FIG. 1 and their descriptions will be left out.

The biometric authentication apparatus 41 includes an image capturing unit 12, a vessel image region extraction unit 13, a vessel characteristic position extraction unit 14, a vessel characteristic size extraction unit 15, a verification determination unit 16, and a vessel information storage unit 17.

At the time of registering, the vessel characteristic position extraction unit 14 outputs vessel position information 19 to the vessel information storage unit 17, and, at the time of authenticating, the vessel characteristic position extraction unit 14 outputs vessel position information 19 to be authenticated to the verification determination unit 16.

At the time of registering, the vessel characteristic size extraction unit 15 outputs vessel size information 20 to the vessel information storage unit 17, and, at the time of authenticating, the vessel characteristic size extraction unit 15 outputs vessel size information 20 to be authenticated to the verification determination unit 16.

At the time of authenticating, the verification determination unit 16 obtains registered vessel position information and size information from the vessel information storage unit 17, and the verification determination unit 16 performs authentication by verifying these pieces of obtained information against verification vessel position information and size information.

Figure 11:
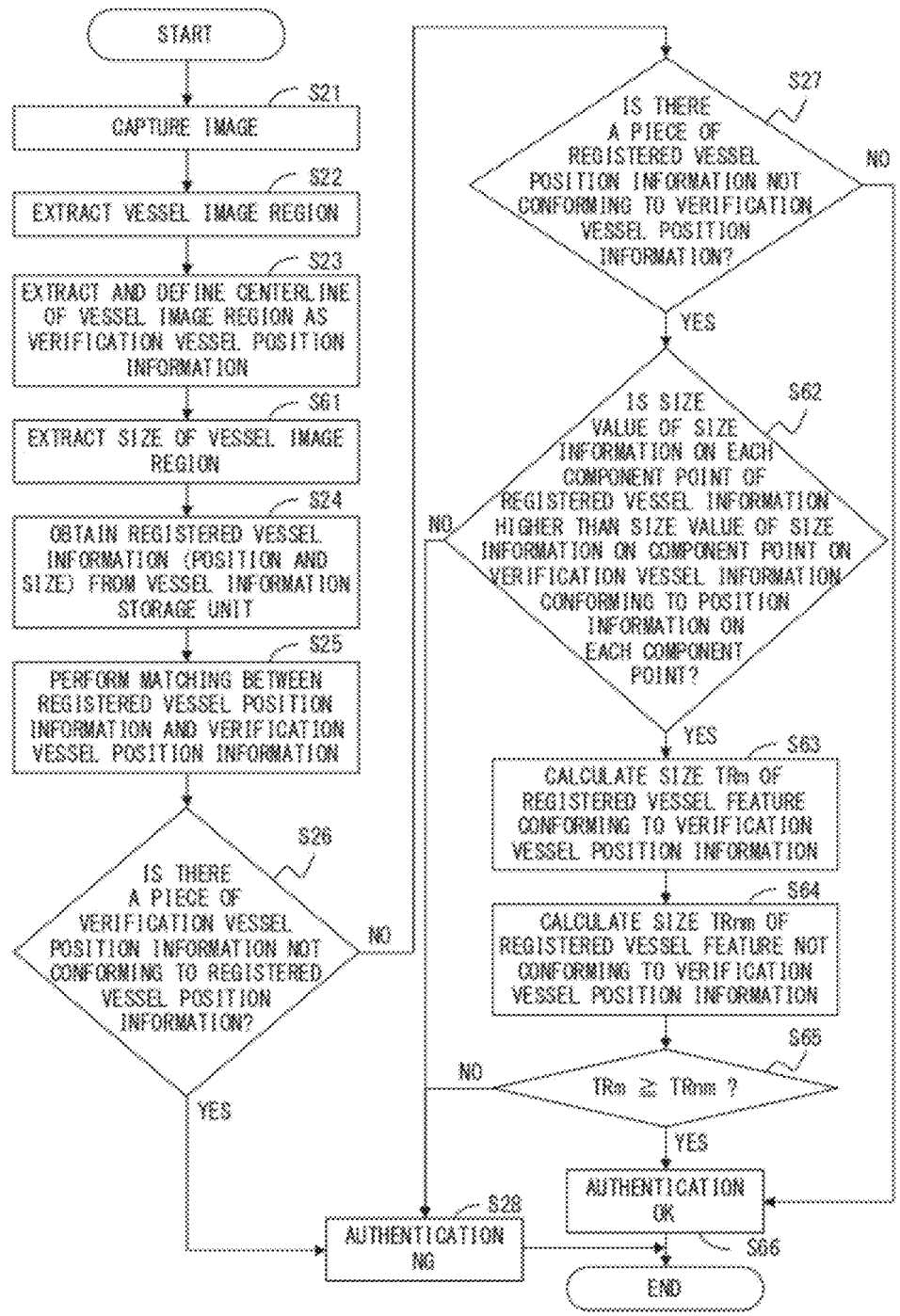
FIG. 11 is a flowchart illustrating a verification process in accordance with the third embodiment.

FIG. 11 is a flowchart illustrating detailed processes at the time of verifying in the third embodiment.

The processes of steps S21 to S28 in FIG. 11 are the same as those of steps S21 to S28 in FIG. 3. In steps S21 to S23, a centerline of a vessel image region to be authenticated is extracted, and the position of the centerline is saved in a storage unit as verification vessel position information.

Next, in step S61, the size of the vessel image region is extracted and saved in a storage unit as size information of the vessel to be verified.

Next, in steps S24 to S28, it is determined whether or not there is a piece of verification vessel position information that does not conform to registered vessel position information and whether or not there is a piece of registered vessel position information that does not conform to verification vessel position information.

When there is a piece of registered vessel position information that does not conform to verification vessel position information (YES in S27), the process proceeds to step S62, where it is determined whether or not size information (e.g., information about value of size such as value of thickness or value of size such as value of thickness) for each component point of registered vessel information is greater than size information for a component point of verification vessel information conforming to position information of each component point.

When the size information of a component point of registered vessel information is greater than the size information of verification vessel information (YES in S62), the process proceeds to step S63, where a size TRm of a registered vessel characteristic conforming to verification vessel position information is calculated or obtained.

Next, a size TRnm of a registered vessel characteristic image that does not conform to verification vessel position information is calculated or obtained (S64).

It is determined whether or not the size TRm of the registered vessel image with position information that is identical with verification vessel information is equal to or greater than the size TRnm of the registered vessel image with not-identical position information (S65).

When the size value of registered vessel information with identical position information is equal to or greater than the size value of registered vessel information with not-identical position information (TRm≥TRnm; YES in S65), the process proceeds to step S66, where a judgment of "authentication OK" is indicated. That is, when the size information of registered vessel information with conforming vessel position information is equal to or greater than the size information of registered vessel information with not-identical position information, it is determined that the inconsistency in vessel position information is occurring due to vasoconstriction caused by a low temperature, and the vessel images are judged to be the same.

On the other hand, when the size value of registered vessel information with identical position information is lower than the size value of verification vessel information with not-identical position information (TRm<TRnm; NO in S65), the process proceeds to step S28, where it is determined that the situation is not occurring due to vasoconstriction caused by a low temperature, indicating a judgment of "authentication NG".

When it is determined in step S62 that the size information of a component point of registered vessel information is equal to or less than the size information of verification vessel information (NO in S62), the process proceeds to step S28, where a judgment of "authentication NG" is indicated. That is, when the size information of a component point of verification vessel information with position information that is identical with registered vessel information is greater than the size information of a component point of registered vessel information, the aforementioned processes of steps S63 to S66 are not performed. Accordingly, it may be determined in the early stage of the authentication process whether or not a judgment of "authentication NG" will be indicated, and hence, the time required for the authentication process is shortened greatly, especially when 1-to-N authentication is performed.

Figure 12:
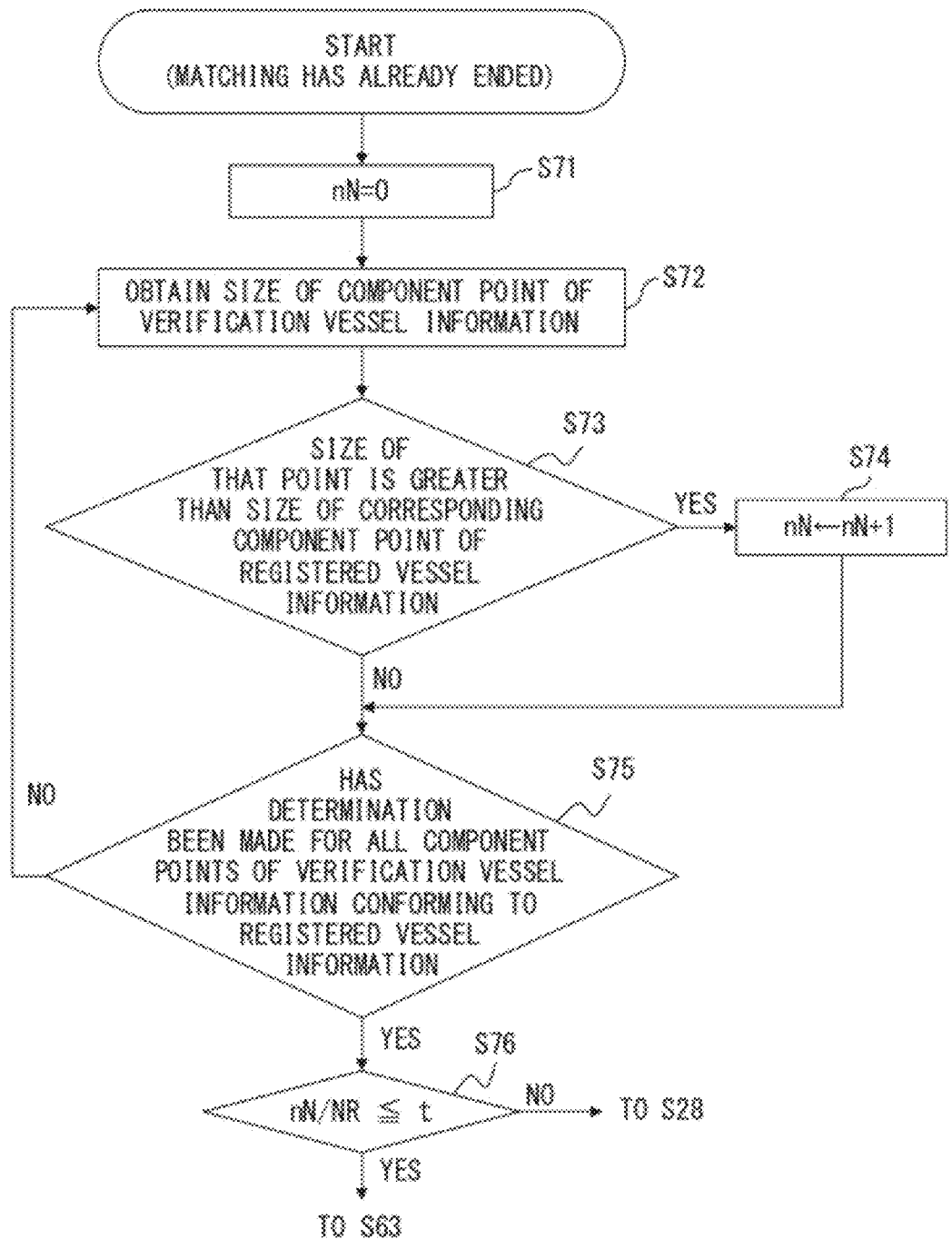
FIG. 12 is a flowchart illustrating a process of comparing the size value of registered vessel information and that of verification vessel information.

FIG. 12 is a flowchart illustrating an example of the process of step S62.

When matching between verification vessel position information and registered vessel position information ends, "0" is set as an initial value of a counter nN (S71). The counter nN is incremented when the size of a component point of verification vessel information is equal to or greater than the size of a component point of registered vessel information.

Next, the size of a component point of verification vessel information is obtained (S72). Next, it is determined whether or not the size of this point (any of the component points of verification vessel information) is greater than the size of a corresponding component point of registered vessel information (S73).

When the size of the component point of verification vessel information is greater than the size of the corresponding component point of registered vessel information (YES in S73), the process proceeds to step S74, where "1" is added to the value of the counter nN.

Meanwhile, when it is determined that the size of the component point of verification vessel information is equal to or less than the size indicated by the corresponding registered vessel information (NO in S73), or after step S74, the process proceeds to step S75. In step S75, it is determined whether or not the determinations for the sizes of all of the component points of verification vessel information conforming to registered vessel information have been completed.

When the determinations for the sizes of all of the component points have not yet been completed (NO in S75), the process returns to step S72, where the size of the next component point of verification vessel information is obtained. After this, the aforementioned processes are repeated.

When the determinations for the sizes of all of the component points of verification vessel information have been completed (YES in S75), the process proceeds to step S76, where it is determined whether or not the value of the counter nN divided by the number of all of the component points NR is equal to or lower than a reference value t.

At the point of completion of the aforementioned processes of steps S71 to S76, the counter nN indicates, from among the component points of verification vessel information, the number of component points having sizes that are equal to or greater than those indicated by registered vessel information. Accordingly, by determining whether or not the value of the counter nN divided by the number of all of the component points NR is equal to or higher than the reference value t, it may be determined whether or not size values of verification vessel information are higher than size values of registered vessel information.

When nN/NR≤t, the process proceeds to step S63 in FIG. 11, where size information of registered vessel information with position information that is identical with verification vessel position information is obtained. Meanwhile, when nN/NR>t, the process proceeds to step S28 in FIG. 11, where it is determined that the vessel image to be authenticated is not identical with a registered vessel image, indicating a judgment of "authentication NG".

In accordance with the third embodiment, the size of a vessel image at the time of authenticating may be calculated and this size may be verified against the size of a registered vessel image, decreasing authentication errors in which a person is mistakenly judged to be another person due to vasoconstriction caused by a low temperature.

Meanwhile, in the third embodiment, it is determined for each component point of vessel information whether or not the size information of registered vessel information is greater than the size information of verification vessel information so that a judgment of "authentication NG" can be indicated at the time point at which the number of component points not satisfying the criterion reaches a reference value. As a result, when 1-to-N authentication is performed, a judgment of "authentication NG" may be indicated in the process of performing the authentication process, thus shortening the overall time required for the authentication.

Figure 13:
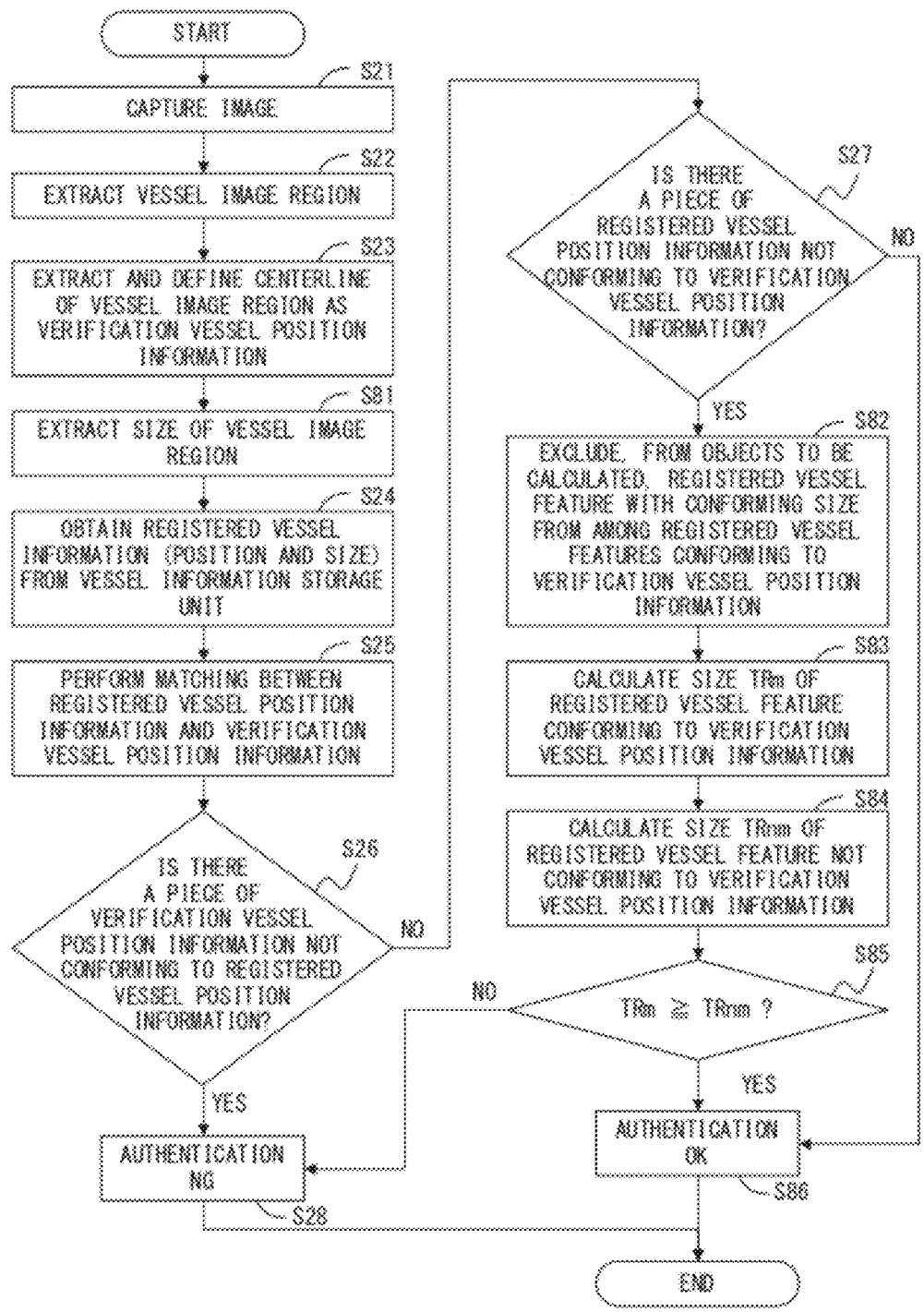
FIG. 13 is a flowchart illustrating a verification process in accordance with the fourth embodiment.

FIG. 13 is a flowchart illustrating detailed processes at the time of verifying performed by a biometric authentication apparatus in accordance with a fourth embodiment. In the fourth embodiment, registered vessel images with vessel information that is identical with verification vessel information are excluded to eliminate the influence of noise such as stains and wrinkles on an object to be authenticated.

The processes of steps S21 to S23 in FIG. 13 are the same as those of steps S21 to S23 in FIG. 4. In steps S21 to S23, a centerline of a photographed vessel image region is extracted. In step S81, the size of a vessel image region to be verified is extracted and saved in a storage unit.

Next, in steps S24 to S28, it is determined whether or not there is a piece of verification vessel position information that does not conform to registered vessel position information and whether or not there is a piece of registered vessel position information that does not conform to verification vessel position information.

When there is a piece of registered vessel position information that is not identical with verification vessel position information (YES in S27), the process proceeds to step S82, where a piece of registered vessel information which is included in pieces of registered vessel information with position information that is identical with verification vessel position information and which has a size that is identical with or similar to the size value of verification vessel information is excluded from objects to be calculated. In step S82, the piece of registered vessel information which is identical with the size value of verification vessel information is excluded in order to exclude, for example, a stain or a wrinkle, whose size would not change due to a temperature change, from registered vessel information, a criterion.

Next, a size TRm of a remaining registered vessel characteristic conforming to verification vessel position information is calculated or obtained (S83). The process of step S83 is the same as that of step S29 in FIG. 4.

Next, a size TRnm of a registered vessel characteristic that does not conform to verification vessel position information is calculated or obtained (S84). The process of step S84 is the same as that of step S30 in FIG. 4.

Next, it is determined whether or not the size TRm indicated by registered vessel information conforming to position information of verification vessel information is equal to or greater than the size TRnm indicated by registered vessel information with non-conforming position information (S84). The process of step S85 is the same as that of step S31 in FIG. 4.

When the size TRm indicated by registered vessel information with position information conforming to verification vessel information is equal to or greater than the size TRnm indicated by registered vessel information with non-conforming position information (YES in S85), the process proceeds to step S86, where a judgment of "authentication OK" is indicated. This is because, when the size value of registered vessel information with conforming vessel position information is equal to or higher than the size value of non-conforming registered vessel information, it is possible that the image was not extracted as a vessel image due to vasoconstriction caused by a low temperature.

Meanwhile, when the size TRm indicated by registered vessel information with position information conforming to verification vessel information is less than the size TRnm of registered vessel information with non-conforming position information (NO in S85), the process proceeds to step S28, where a judgment of "authentication NG" is indicated.

In accordance with the fourth embodiment described above, it is possible to decrease authentication errors in which a person is mistakenly judged to be another person due to vasoconstriction caused by a low temperature.

In addition, a piece of registered vessel information which is included in pieces of registered vessel information with position information conforming to verification vessel position information and which has size information that is identical with verification vessel information is excluded from processing objects. Accordingly, a stain, a wrinkle or the like, whose size would not be affected by temperature, may be excluded from objects to be authenticated, enhancing the authentication accuracy.

FIG. 14 illustrates a configuration of a biometric authentication apparatus 51 in accordance with a fifth embodiment. In the fifth embodiment, a size histogram for each component point is used to narrow down vessel images to those that may possibly be a registrant's vessel image. The fifth embodiment is an example of a situation in which 1-to-N authentication is performed. In the following, like blocks are indicated by like numerals used in FIG. 1 illustrating the biometric authentication apparatus 11 so that their descriptions can be left out.

The biometric authentication apparatus 51 includes an image capturing unit 12, a vessel image region extraction unit 13, a vessel characteristic position extraction unit 14, a vessel characteristic size extraction unit 15, a verification determination unit 16, a vessel information storage unit 17, and a vessel characteristic size histogram generation unit 52.

At the time of registering, the vessel characteristic position extraction unit 14 outputs size position information 19 to the vessel information storage unit 17, and, at the time of authenticating, the vessel characteristic position extraction unit 14 outputs a piece of vessel position information 19 to be verified to the verification determination unit 16.

At the time of registering, the vessel characteristic size extraction unit 15 outputs vessel size information 20 to the vessel information storage unit 17, and, at the time of authenticating, the vessel characteristic size extraction unit 15 outputs a piece of vessel size information to be verified to the verification determination unit 16.

The vessel information storage unit 17 stores vessel information including vessel position information 19 and vessel size information 20 on a plurality of registrants.

The vessel characteristic size histogram generation unit 52 creates a vessel size histogram from the size of a registered vessel image or a verification vessel image extracted by the vessel characteristic size extraction unit 15. A vessel size histogram 53 created at the time of registering is stored in the vessel information storage unit 17. At the time of authenticating, the created vessel size histogram 53 of the verification vessel image is output to the verification determination unit 16. The vessel size histogram 53 is, for example, a histogram that includes size values on the horizontal axis and the number of component points with the same sizes on the vertical axis.

When 1-to-N authentication is performed, the verification determination unit 16 narrows down registrants to those (identification candidates) with a vessel size histogram that is similar to the vessel size histogram 53 of a vessel image to be authenticated (a candidate selection unit). Pieces of registered vessel information of the selected identification candidates are then verified against verification vessel information. Accordingly, when 1-to-N authentication is performed, the number of pieces of registered vessel information may be limited by narrowing down registrants, thus shortening the overall time required for 1-to-N authentication.

Figure 15A:
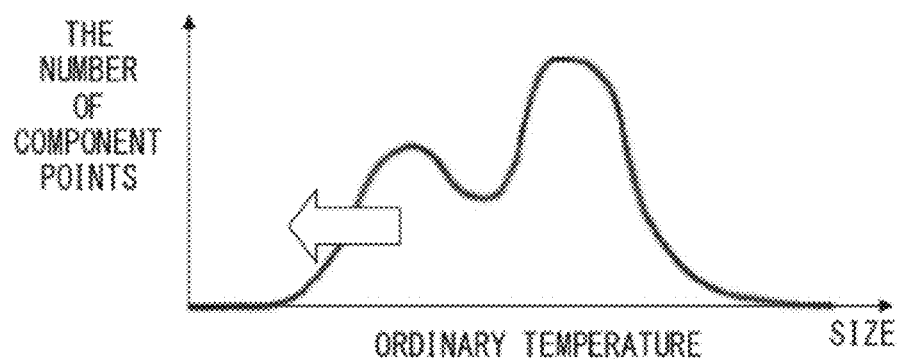
FIGS. 15A-15B illustrate changes in the histogram of the size of a vessel.
Figure 15B:
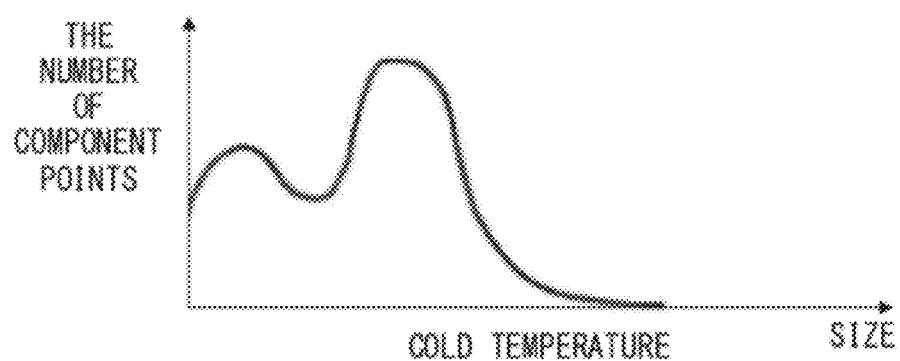

FIG. 15A indicates a vessel size histogram at an ordinary temperature, and FIG. 15B indicates a vessel size histogram at a low temperature.

For the vessel size histograms illustrated in FIGS. 15A and 15B, the horizontal axis represents the size of each component point of vessel information, and the vertical axis represents the number of component points. At a low temperature, due to vasoconstriction, the entirety of the vessel size histogram illustrated in FIG. 15A moves in the direction indicated by the arrow, assuming the shape of the histogram illustrated in FIG. 15B.

The histogram involves a small amount of data with respect to vessel information, including a vessel position and a vessel size, and hence, by narrowing down identification candidates using the histogram, the time required for 1-to-N authentication may be shortened.

FIG. 16 is a flowchart illustrating detailed processes at the time of registering a vessel image in the fifth embodiment.

The processes of steps S11 to S16 in FIG. 16 are the same as those of steps S11 to S16 in FIG. 3. In steps S11 to S16, position information of and the size of a centerline of a vessel image region to be registered are extracted, and these pieces of information are saved as registered vessel information in the vessel information storage unit 17.

Next, in step S91, the number of component points with the same size within the registered vessel image is counted, and a vessel size histogram is created. The created vessel size histogram is saved in the vessel information storage unit 17.

Figure 17:
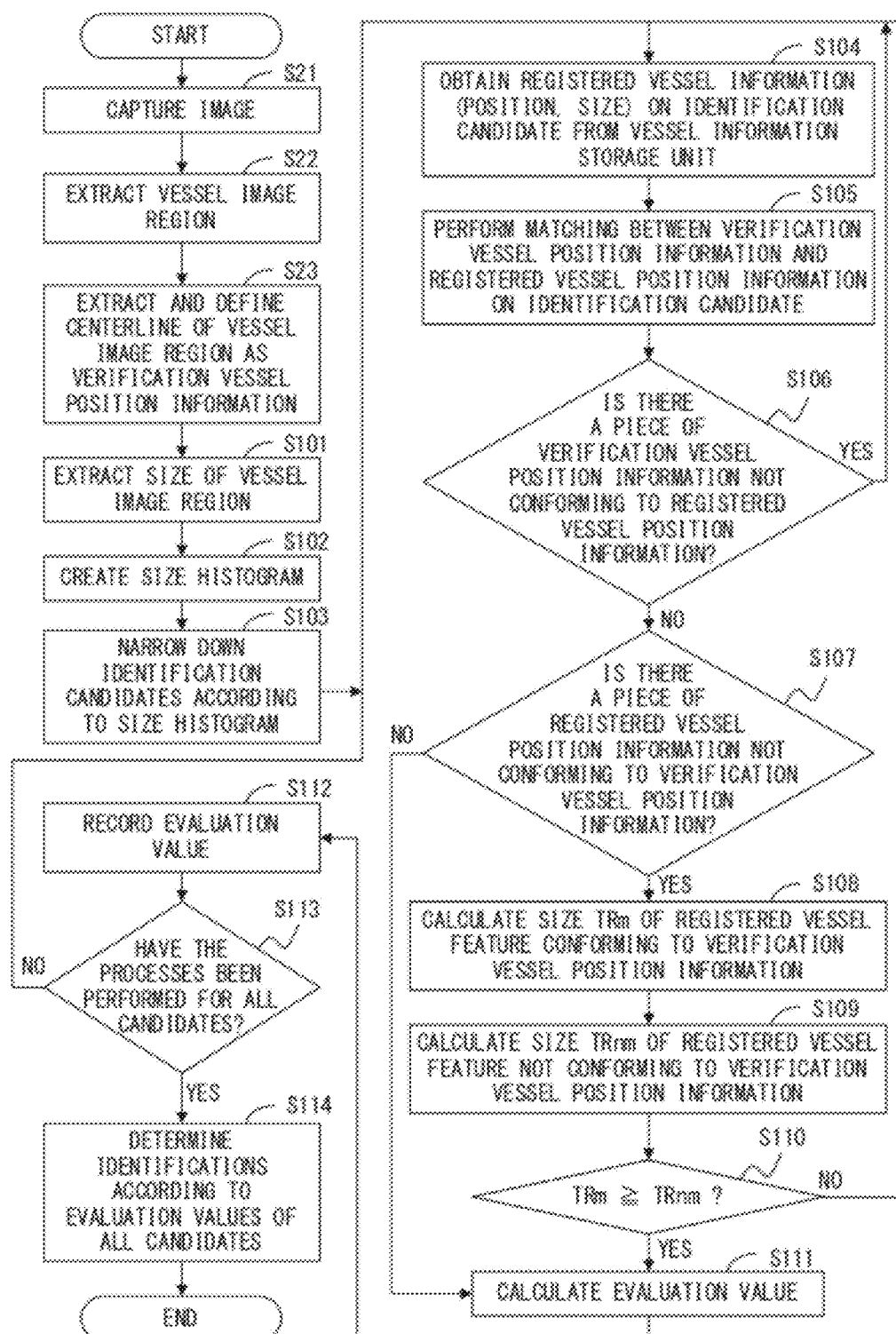
FIG. 17 is a flowchart illustrating a verification process in accordance with the fifth embodiment.

FIG. 17 is a flowchart illustrating detailed processes at the time of authenticating in the fifth embodiment.

The processes of steps S21 to S23 in FIG. 17 are the same as those of steps S21 to S23 in FIG. 4. In steps S21 to S23, a centerline of a vessel image region is extracted, and the coordinates of the centerline are saved as verification vessel position information.

Next, in step S101, the sizes of the vessel image region are extracted. The number of component points with the same size from among the extracted vessel sizes is counted, and a vessel size histogram is created (S102).

Next, identification candidates are narrowed down according to the vessel size histogram (S103).

As an example, in the process of step S103, identification candidates are narrowed down as follows. Let HI(t) (1≤t≤timax) be the array of the size histogram of verification vessel information. timax represents the maximum value of the size values of verification vessel information. Let HR(t) (1≤t≤trmax) be the array of the size histogram of registered vessel information of a certain registrant. trmax represents the maximum value of the size values of registered vessel information. Let $\epsilon$ ($\epsilon>0$) be a value decided on in advance. In this case, when timax+$\epsilon$≤trmax and two values decided on in advance are w1 and w2, registrants are narrowed down to those with a value represented by formula 1 in FIG. 18 that is equal to or lower than a threshold decided on in advance.

The following formula 2 is equivalent to formula 1 but with the details of the range of i of $\Sigma$ not being shown.

$$w1 \times \Sigma |HR(i)-HI(i-(trmax-timax))|+w2 \times \Sigma HR(i) \quad \text{Formula 2}$$

$\Sigma$ in formula 2 is an operation for calculating an accumulated value of the range determined by a variable i. The variable i of $\Sigma$ to be multiplied by w1 is a value in the range of 1+(trmax−timax)≤i≤tramx. The variable i of $\Sigma$ to be multiplied by w2 is a value in the range of 1≤i≤1+(trmax−timax).

In formula 1 in FIG. 18 (and in formula 2 above), the following operation is performed. The value of w1 multiplied by the absolute value sum of the difference between the value of the array HR(i) of the vessel size histogram of registered vessel information of an identification candidate and the value of the array HI (i) of the size histogram of verification vessel information (1+(trmax−timax)≤i≤tramx) is calculated. In addition, the value of w2 multiplied by the sum of the array HR(i) of the vessel size histogram of registered vessel information of an identification candidate is calculated, and registrants are narrowed down to identification candidates with the sum of the values that is equal to or lower than a threshold.

In accordance with the aforementioned operation, registrants having a vessel size histogram that is similar to the vessel size histogram of verification vessel information (or identification candidates) may be selected.

The method for narrowing down identification candidates according to the size histogram of verification vessel information is not limited to the operation method above. Another operation method may be applied in which a similarity between, for example, diagrams or data arrays is calculated.

Referring back to FIG. 17, registered vessel information (position information and size information) on an identification candidate is obtained from the vessel information storage unit 17 (S104).

Next, a matching process is performed between registered vessel position information of the identification candidate and verification vessel position information (S105). In the matching process in step S105, registered vessel position information of a person to be identified is compared with verification vessel position information.

Next, it is determined whether or not there is a piece of verification vessel position information that does not conform to registered vessel position information (S106). When there is not a piece of verification vessel position information that does not conform to registered vessel position information (YES in S106), the process proceeds to step S107, where it is determined whether or not there is a piece of registered vessel information that does not conform to verification vessel position information.

When there is a piece of registered vessel position information with position information that is not identical with verification vessel position information (YES in S107), the process proceeds to step S108, where the size TRm of a registered vessel characteristic with position information that is identical with verification vessel position information is calculated or obtained.

Next, the size TRnm of a registered vessel characteristic with position information that is not identical with verification vessel position information is calculated (S109). It is then determined whether or not the size TRm indicated by registered vessel information with identical position information is equal to or greater than the size TRnm indicated by registered vessel information with not-identical position information (S110).

Except for the fact that the information is registered vessel information of an identification candidate, the aforementioned processes of steps S106 to S110 are the same as those of steps S24 to S31 in FIG. 4.

Next, an evaluation value is calculated from the sum of a value indicating the degree of the verification of vessel position information and a value indicating the degree of a requirement on the size value of verification vessel information (S111).

As an example, the evaluation value may be calculated as follows. The number of components of registered vessel information with position information that is identical with verification vessel information is divided by the number of all component points of registered vessel information, and this calculated value is defined as a value Em indicating the degree of the verification of vessel position information. Em may be represented by the following formula.

$Em$=(the number of component points of registered vessel information with identical position information)/(the number of all component points of registered vessel information)

The absolute value sum of the differences between the sizes of component points (sizes of a vessel) of verification vessel information with position information conforming to registered vessel information and the sizes of component points (sizes of a vessel) of registered vessel information with position information conforming to verification vessel information is defined as a value Et indicating the degree of a requirement on the sizes of the vessel. Et may be represented by the following formula.

$Et=\Sigma|$(size of component point of verification vessel information)−(size of component point of registered vessel information with position information that is identical with verification vessel information)$|$ The component points above are a plurality of points indicating the positions of vessels, e.g., points indicating the positions of pixels of a centerline of a vessel image. When the centerline is approximated by a straight line, the start point and the end point of this straight line or the start point, the end point, and any point between the start point and the end point are defined as component points.

The value Em indicating the degree of the verification of vessel position information and the value Et indicating the degree of a requirement on the size of the vessel are weighted by two values km and kt determined in advance, and the sum of these weighted values is calculated as an evaluation value.

The evaluation value E may be represented by the following formula.

$$E=km \cdot Em+kt \cdot Et$$

In accordance with this formula, at an ordinary temperature, the evaluation value E becomes high because of km·Em indicating the degree of consistency in vessel position information. At a low temperature, kt·Et indicating the degree of the size requirement of the vessel may become high, making up for the reduction in km·Em.

Next, the calculated evaluation value is stored in the vessel information storage unit 17 (S112). Next, it is determined whether or not the aforementioned processes have been performed for all identification candidates (S113).

When there is an identification candidate for whom an evaluation value is not calculated (NO in S113), the process returns to step S104 to perform the aforementioned processes again.

When the calculation of the evaluation values of all of the identification candidates is finished (YES in S113), the process proceeds to step S114, where the propriety of the authentication is determined according to the evaluation values E of all of the candidates.

Here, descriptions will be given of an example of the data configurations of registered vessel information of a registrant and verification vessel information of a person to be authenticated.

FIG. 19 illustrates a data configuration of vessel position information wherein information indicating positions is stored at pixels corresponding to centerlines of vessels. The coordinates of the pixels of the centerlines are represented by x-coordinates and y-coordinates with the upper-left corner being the origin.

In FIG. 19, for ease of description, both the images of the centerlines of a vessel image and data "1" stored at the positions of the pixels of centerlines are depicted, but, in fact, the memory stores "1" at a pixel corresponding to a centerline.

As an example, "1"s are stored at the pixels of the coordinates of the centerlines, (6,1), (6,2), (7,3), (8,4), and soon. "1"s are stored at the pixels of the coordinates (3,12), (4,11), and so on. "0"s are stored at pixels not including the centerlines of the vessels. Alternatively, only data indicating a centerline (e.g., "1") may be stored by associating this data with the coordinates of a pixel of a centerline, omitting data on pixels not including a centerline. Storing only data on pixels of a centerline of a vessel may decrease the amount of data in comparison with a situation in which data on all pixels is stored.

When position information (e.g., "1") is stored at pixels corresponding to a centerline as described above, size information may be stored at the positions of corresponding pixels within another image memory.

When vessel position information is stored as image format data as described above, vessel position information may be verified as follows.

It is examined whether or not "1" is stored at the same coordinates of verification vessel position information as coordinates at which "1" is stored as position information of a centerline of a registered vessel image, so that it may be determined whether or not there is a piece of verification vessel position information that does not conform to registered vessel position information. Meanwhile, it is examined whether or not "1" is stored at the same coordinates of registered vessel position information as coordinates at which "1" is stored as verification vessel position information, so that it may be determined whether or not there is a piece of registered vessel position information that does not conform to verification vessel position information. Size information of a vessel image may be determined using a similar method.

FIG. 20 illustrates a data configuration of registered vessel information wherein information indicating a vessel size is stored at pixels corresponding to centerlines of vessels.

FIG. 20 illustrates an example of a situation in which the positions of centerlines of a vessel and vessel size information are stored using x-coordinates and y-coordinates with the upper-left corner being the origin.

Let P(i) be an array of registered vessel position information and T(P(i)) be an array of size information. Horizontal scanning is performed with reference to the origin, a vessel having the same size is traced from the start point to the end point, and a branch of the vessel is traced to determine an array sequence. The array P(i) of registered vessel information indicating vessel size "10" illustrated in FIG. 20 may be represented as follows.

P(1)=(6,1), P(2)=(6,2), P(3)=(7,3), P(4)=(8,4), P(5)=(8,5), P(6)=(9,6), P(7)=(9,7)

The array T(P(i)) of size information corresponding to the aforementioned array P(i) of vessel position information may be represented as follows.

T(P(1))=10, T(P(2))=10, T(P(3))=10, T(P(4))=10, T(P(5))=10, T(P(6))=10, T(P(7))=10

In FIG. 20, the values of the array T(P(1)) to T(P(7)) of size information are stored at the coordinates of the aforementioned array P(1) to P(7) of registered vessel position information. That is, "10"s are stored at coordinates (6,1), (6,2), (7,3), (8,4), (8,5), (9,6) and (9,7) as size information.

Similarly, the array (P)(i) of registered vessel information with vessel size "2" may be represented as follows.

P(8)=(7,6), P(9)=(7,7), P(10)=(6,8), P(11)=(5,9), P(12)=(4,10), P(13)=(4,11)

The array T(P(i)) of size information corresponding to the aforementioned array P(i) of registered vessel position information may be represented as follows.

T(P(8))=2, T(P(9))=2, T(P(10))=2, T(P(11))=2, T(P(12))=2, T(P(13))=2

The values of the array T(P(8)) to T(P(13)) of size information are stored at the coordinates of the aforementioned array P(8) to P(13) of registered vessel position information. That is, "2"s are stored at the coordinates (7,6), (7,7), (6,8), (5,9), (4,10) and (4,11) as size information.

Similarly, the array P(i) of registered vessel position information of a vessel with size "6" may be represented as follows.

P(14)=(10,8), P(15)=(10,9), . . . P(23)=(10,17), P(24)=(10,18)

The array T(P(i)) of size information corresponding to the aforementioned array P(i) of registered vessel position information may be represented as follows.

T(P(14)=6, T(P(15))=6, . . . T(P(23))=6, T(P(24))=6

The values of the array T(P(14)) to T(P(24)) of size information are stored at the coordinates of the aforementioned array P(14) to P(24) of registered vessel position information. That is, "6"s are stored at the coordinates (10,8), (10,9), . . . (10,17), (10,18) as size information.

FIG. 21 illustrates a data configuration of verification vessel information of a registrant. Verification vessel information includes verification vessel position information and size information. Let PI(i) indicate an array of verification vessel position information and TI(P(i)) indicate an array of size information. FIG. 21 also illustrates the positions of centerlines of vessels using coordinates with the upper-left corner being the origin. The verification vessel image in FIG. 21 includes three vessels respectively having the sizes "7", "3", and "2".

The array PI(i) of verification vessel position information with vessel size "7" may be represented as follows.

PI(1)=(6,1), PI(2)=(6,2), PI(3)=(7,3), PI(4)=(8,4), PI(5)=(8,5), PI(6)=(9,6), PI(7)=(9,7)

The array TI(PI(i)) of size information corresponding to the aforementioned array PI(i) of verification vessel position information may be represented as follows.

TI(PI(1))=7, TI(PI(2))=7, TI(PI(3))=7, TI(PI(4))=7, TI(PI(5))=7, TI(PI(6))=7, TI(PI)(7))=7

The values of the array T(P(1)) to TI(P(7)) of size information are stored at the coordinates of the aforementioned array PI(1) to PI(7) of verification vessel position information. That is, "7"s are stored at the coordinates (6,1), (6,2), . . . (9,6), (9,7) as size information.

Similarly, the array PI(i) of verification vessel position information with vessel size "3" may be represented as follows.

PI(8)=(10,8), PI(9)=(10,9) . . . PI(17)=(10,17), PI(18)=(10, 18)

The array TI(PI(i)) of size information corresponding to the aforementioned array of verification vessel position information may be represented as follows.

TI(PI(8))=3, TI(PI(9))=3, . . . TI(PI(17))=3, TI(PI(18))=3

The values of the array TI(PI(8)) to TI(PI(18)) of size information are stored at the coordinates of the aforementioned array PI(8) to PI(18) of verification vessel position information. That is, "3"s are stored at the coordinates (10,8), (10,9), . . . (10,17), (10,18) as size information.

FIG. 22 illustrates a data configuration of verification vessel information of another person. FIG. 22 also illustrates the positions of centerlines of vessels using coordinates with the upper-left corner being the origin. The verification vessel image includes five vessels respectively having sizes "5", "8", "3", "5" and "4".

The array PI(i) of verification vessel position information with vessel size "8" may be represented as follows.

PI(1)=(8,5), PI(2)=(9,6), PI(3)=(9,7)

The array TI(PI(i)) of size information corresponding to the aforementioned array PI(i) of verification vessel position information may be represented as follows.

TI(PI(1))=8, TI(PI(2))=8, TI(PI(3))=8

The values of the array TI(P(1)) to TI(P(3)) of size information are stored at the coordinates of the aforementioned array PI(1) to PI(3) of verification vessel position information. That is, "8"s are stored at the coordinates (8,5), (9,6), and (9,7) as size information.

Similarly, the array PI(i) of verification vessel position information of a vessel connected to the vessel above and having size "5" may be represented as follows.

PI(4)=(7,6), PI(5)=(7,7), PI(6)=(6,8), PI(7)=(5,9), PI(8)=(4, 10), PI (9)=(4,11)

The array TI(PI(i)) of size information corresponding to the aforementioned array PI(i) of verification vessel position information may be represented as follows.

TI(PI(4))=5, TI(PI(5))=5, TI(PI(6))=5, TI(PI(7))=5, TI(PI(8))=5, TI(PI(9))=5

The values of the array TI(PI(4)) to TI(PI(9)) of size information are stored at the coordinates of the aforementioned array PI(4) to PI(9) of verification vessel position information. That is, "5"s are stored at the coordinates (7,6), (7,7), (6,8), (5,9), (4,10) and (4,11) as size information. Similarly, size information is stored at the coordinates of centerlines of other vessels.

The amount of data on vessel information may be decreased by storing only coordinate data on positions at which vessels are present as the coordinate data of the array P(i) of registered vessel position information and the array PI(i) of verification vessel position information. When the data is saved as image format data, verification of vessel position information and verification of size information may be performed with one set of data by storing size information of a vessel at the positions of pixels of a centerline of this vessel. As a result, the amount of data on vessel information may be decreased. Verification of vessel position information and verification of size information may be performed simultaneously.

When vessel information is stored using array format data, verification of verification vessel information and verification of registered vessel information may be performed as follows.

The coordinates of the array P(i) of registered vessel position information are verified against the coordinates of the array PI(i) of verification vessel position information, determining whether or not there are identical coordinates. Accordingly, it may be determined whether or not there is apiece of verification vessel position information that does not conform to registered vessel position information (e.g., the process of S26 in FIG. 4).

The coordinates of the array PI(i) of verification vessel position information are verified against the coordinates of the array P(i) of registered vessel position information, determining whether or not there are identical coordinates. Accordingly, it may be determined whether or not there is apiece of registered vessel position information that does not conform to verification vessel position information (e.g., the process of S27 in FIG. 4).

Coordinates of the array P(i) of registered vessel position information conforming to coordinates of the array PI(i) of verification vessel position information are extracted, and the value of the array T(P(i)) of size information of registered vessel information corresponding to these extracted coordinates is obtained. Accordingly, the size TRm of registered vessel information conforming to verification vessel position information may be determined (the process of S29 in FIG. 4).

In addition, coordinates of the array T(P(i)) of registered vessel position information that does not conform to coordinates of the array PI(i) of verification vessel position information are extracted, and the value on the array T(P(i)) of size information of registered vessel position information corresponding to these extracted coordinates is obtained. Accordingly, the size TRnm of registered vessel information that does not conform to verification vessel position information may be determined (the process of S30 in FIG. 4).

When size information is not stored at the same coordinates of verification vessel information as coordinates at which size information of registered vessel information is stored, this piece of size information of registered vessel information may be obtained as the size TRnm of registered vessel information that does not conform to verification vessel position information. This corresponds to, for example, the process of step S30 in FIG. 4.

The value of the array T(P(i)) of size information corresponding to coordinates of the array P(i) of registered vessel position information is obtained. In addition, the value of the array TI(PI(i)) of size information corresponding to the array PI(i) of verification vessel position information with identical coordinates is obtained. It is then determined whether the value of the array T(P(i)) of size information of registered vessel information is higher than the value of the array TI(PI(i)) of size information of verification vessel information (e.g., the process of S62 in FIG. 11).

When registered vessel information illustrated in FIG. 20 is verified against verification vessel information of a person illustrated in FIG. 21, there is a piece of registered vessel position information that does not conform to verification vessel position information. As an example, the vessel with size "2" in FIG. 20 is not present in FIG. 21.

In this case, the sizes of pieces of registered vessel information conforming to verification vessel position information are "10", "6", and "5", which are greater than "2" and "3", the sizes of pieces of registered vessel information that do not conform to verification vessel position information. Accordingly, it may be determined that the situation is caused by vasoconstriction due to a low temperature, indicating a judgment of "authentication OK".

When registered vessel information illustrated in FIG. 20 is verified against verification vessel information of another person illustrated in FIG. 22, there is a piece of registered vessel position information that does not conform to verification vessel position information. As an example, the vessel with size "10" in FIG. 20 is not present in FIG. 22.

In this case, the sizes of pieces of registered vessel information conforming to verification vessel position information are "2", "6", and "3", which are less than "10", the size of a piece of registered vessel information that does not conform to verification vessel position information. Accordingly, it may be determined that the situation is not caused by vasoconstriction due to a low temperature, indicating a judgment of "authentication NG".

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

EXPLANATION OF THE CODES

11 Biometric authentication apparatus
12 Image capturing unit
13 Vessel image region extraction unit
14 Vessel characteristic position extraction unit
15 Vessel characteristic size extraction unit
16 Verification determination unit
17 Vessel information storage unit
32 Temperature measurement unit
33 Temperature storage unit

What is claimed is:

1. A biometric authentication apparatus comprising:
an image shooting unit to capture a verification vessel image of a person to be authenticated;
an authentication unit to verify verification vessel position information of the verification vessel image of the person to be authenticated captured by the image shooting unit against registered vessel position information of a registered vessel image registered in advance, and to perform authentication using vessel size information of the registered vessel image registered in advance when the verification vessel position information is not identical with the registered vessel position information;
a histogram generation unit to generate a registered vessel size histogram according to vessel size information of a plurality of component points of a plurality of registered vessel images registered in advance, and to generate a verification vessel size histogram according to vessel size information of a plurality of component points of the verification vessel image to be verified; and
a candidate selection unit to calculate a similarity between the verification vessel size histogram and the plurality of registered vessel size histograms, and to select a registrant indicating a similarity that is equal to or higher than a certain value,
wherein the authentication unit verifies the registered vessel position information of the registrant selected by the candidate selection unit against the verification vessel position information of a person to be authenticated.

2. The biometric authentication apparatus according to claim 1, wherein
when there is a piece of registered vessel position information that is not identical with the verification vessel position information of the person to be authenticated, the authentication unit compares first size information of a vessel of the registered vessel image having position information that is identical with the verification vessel position information with second size information of a vessel of the registered vessel image having position information that is not identical with the verification vessel position information, and, when the first size information is equal to or greater than the second size information, the authentication unit determines that the verification vessel image is identical with the registered vessel image.

3. The biometric authentication apparatus according to claim 1, comprising
a temperature measurement unit to measure a temperature at the time of registering and a temperature at the time of verifying; and
a temperature storage unit to associate the temperature at the time of registering measured by the temperature measurement unit with registered vessel positioning information of a registrant and to store this temperature and this registered vessel positioning information associated with each other, wherein
when the temperature at the time of authenticating measured by the temperature measurement unit is higher than the temperature at the time of registering stored by the temperature storage unit, the authentication unit determines whether or not first size information of a vessel of the registered vessel image having position information that is identical with the verification vessel position information is equal to or greater than second size information of a vessel of the registered vessel image having position information that is not identical with the verification vessel position information.

4. The biometric authentication apparatus according to claim 1, wherein
the authentication unit obtains registered vessel information including pieces of registered vessel position information and pieces of vessel size information of a plurality of component points of the registered vessel image registered in advance, obtains verification vessel information including pieces of verification vessel position information and pieces of vessel size information of a plurality of component points of the verification vessel image, and compares the size information of each component point of the registered vessel information with the size information of each component point of the verification vessel information having position information that is identical with the registered vessel position information, and
when the authentication unit determines that the size information of the registered vessel information is greater than the size information of the verification vessel information, the authentication unit determines whether or not first size information of a vessel of the registered vessel information having position information that is identical with the verification vessel position information is equal to or greater than second size information of a vessel of the registered vessel information having position information that is not identical with the verification vessel position information.

5. The biometric authentication apparatus according to claim 4, wherein the authentication unit comprises an evaluation value calculation unit to calculate, as an evaluation value, a sum of a first value and a second value both of which are weighted, when first size information of the registered vessel information having position information that is identical with the verification vessel position information is equal to or greater than second size information of the registered vessel information having position information that is not identical with the verification vessel position information, wherein the first value is the number of component points of the registered vessel information having position information that is identical with the verification vessel position information which is divided by the number of all component points of the registered vessel information, and the second value is a sum of absolute values of differences between sizes of component points of the verification vessel information and the registered vessel information having identical position information, and authentication is performed according to the evaluation value calculated by the evaluation value calculation unit.

6. The biometric authentication apparatus according to claim 1, wherein the authentication unit obtains registered vessel information including pieces of registered vessel position information and pieces of vessel size information of the registered vessel image registered in advance, obtains verification vessel information including pieces of verification vessel position information and pieces of vessel size information of the verification vessel image to be verified, and excludes, from verification targets, a piece of registered vessel information having position information that is identical with the verification vessel position information and a piece of vessel size information that is identical with the verification vessel position information.

7. A biometric authentication method comprising:

capturing a verification vessel image of a person to be authenticated by using an image shooting unit;

verifying verification vessel position information of the verification vessel image of the person to be authenticated captured by the image shooting unit against registered vessel position information of a registered vessel image registered in advance, and performing authentication using vessel size information of the registered vessel image registered in advance when the verification vessel position information is not identical with the registered vessel position information;

creating a registered vessel size histogram according to vessel size information of a plurality of component points of a plurality of registered vessel images registered in advance;

creating a verification vessel size histogram according to vessel size information of a plurality of component points of the verification vessel image to be verified;

calculating a similarity between the verification vessel size histogram and the plurality of registered vessel size histograms, and selecting a registrant indicating a similarity that is equal to or higher than a certain value; and verifying the registered vessel position information of the selected registrant against the verification vessel position information of a person to be authenticated.

8. The biometric authentication method according to claim 7, comprising when there is a piece of registered vessel position information that is not identical with the verification vessel position information of the person to be authenticated, comparing first size information of a vessel of the registered vessel image having position information that is identical with the verification vessel position information with second size information of a vessel of the registered vessel image having position information that is not identical with the verification vessel position information, and, when the first size information is equal to or greater than the second size information, determining that the verification vessel image is identical with the registered vessel image.

9. The biometric authentication method according to claim 7, comprising:

measuring a temperature at the time of registering a vessel image and a temperature at the time of authenticating the vessel image;

associating the measured temperature at the time of registering with registered vessel positioning information of a registrant and storing, in a storage unit, this temperature and this registered vessel positioning information associated with each other; and when the temperature at the time of registering stored in the storage unit is higher than the temperature at the time of authenticating, determining whether or not first size information of a vessel of the registered vessel image having position information that is identical with the verification vessel position information is equal to or greater than second size information of a vessel of the registered vessel image having position information that is not identical with the verification vessel position information.

10. The biometric authentication method according to claim 7, comprising:

obtaining registered vessel information including pieces of registered vessel position information and pieces of vessel size information of a plurality of component points of the registered vessel image stored in advance;

obtaining verification vessel information including pieces of verification vessel position information and pieces of vessel size information of a plurality of component points of the verification vessel image to be verified;

comparing the size information of each component point of the registered vessel information with the size information of each component point of the verification vessel information having position information that is identical with the registered vessel position information; and when it is determined that the size information of the registered vessel information is greater than the size information of the verification vessel information, determining whether or not first size information of a vessel of the registered vessel information having position information that is identical with the verification vessel position information is equal to or greater than second size information of a vessel of the registered vessel information having position information that is not identical with the verification vessel position information.

11. The biometric authentication method according to claim 7, comprising:
- obtaining registered vessel information including pieces of registered vessel position information and pieces of vessel size information of the registered vessel image stored in advance;
- obtaining verification vessel information including pieces of verification vessel position information and pieces of vessel size information of the verification vessel image to be verified; and
- excluding, from verification targets, a piece of registered vessel information having position information that is identical with the verification vessel position information and vessel size information that is identical with the verification vessel position information.

12. The biometric authentication method according to claim 11, comprising
- comparing first size information of the registered vessel information having position information that is identical with the verification vessel position information with second size information of the registered vessel information having position information that is not identical with the verification vessel position information;
- when the first size information is equal to or greater than the second size information, calculating, as an evaluation value, a sum of a first value and a second value both of which are weighted, wherein the first value is the number of component points of the registered vessel information having position information that is identical with the verification vessel position information which is divided by the number of all component points of the registered vessel information, and the second value is a sum of absolute values of differences between sizes of component points of the verification vessel information and the registered vessel information having identical position information; and
- performing authentication according to the calculated evaluation value.

* * * * *